(12) United States Patent
Gautier et al.

(10) Patent No.: US 8,506,739 B2
(45) Date of Patent: Aug. 13, 2013

(54) METHOD OF PRODUCING SAILS USING REINFORCED, FORMED FABRICS

(75) Inventors: Gérard Gautier, Yens (CH); Edouard Kessi, St-Prex (CH)

(73) Assignee: Createx S.A. (CH)

( * ) Notice: Subject to any disclaimer, the term of this patent is extended or adjusted under 35 U.S.C. 154(b) by 85 days.

(21) Appl. No.: 12/326,683

(22) Filed: Dec. 2, 2008

(65) Prior Publication Data

US 2009/0133818 A1    May 28, 2009

Related U.S. Application Data

(63) Continuation-in-part of application No. 10/521,160, filed as application No. PCT/CH03/00415 on Jun. 25, 2003, now Pat. No. 7,479,200.

(30) Foreign Application Priority Data

Jul. 2, 2002 (CH) ........................................ 1150/02

(51) Int. Cl.
*B63H 9/06* (2006.01)
(52) U.S. Cl.
USPC ........ 156/182; 156/221; 156/242; 156/307.5; 114/102.31
(58) Field of Classification Search
USPC ...................................................... 156/583.3
See application file for complete search history.

(56) References Cited

U.S. PATENT DOCUMENTS

| | | | |
|---|---|---|---|
| 2,356,225 A | 8/1944 | Cunnington | |
| 2,410,888 A | 11/1946 | Lucy | |
| 2,565,219 A | 8/1951 | Gardiner et al. | |
| 2,665,132 A | 1/1954 | Robinson | |
| 2,965,532 A | 12/1960 | Taylor | |
| 2,998,343 A | 8/1961 | Gold et al. | |
| 3,903,826 A | 9/1975 | Andersen | |
| 3,954,076 A | 5/1976 | Fracker | |
| 3,956,447 A | 5/1976 | Denommee et al. | |
| 3,974,791 A | 8/1976 | Haarstick et al. | |
| 4,133,711 A | 1/1979 | August et al. | |
| 4,444,822 A | 4/1984 | Doyle et al. | |
| 4,499,842 A | 2/1985 | Mahr | |
| 4,554,205 A | 11/1985 | Mahr | |
| 4,590,121 A | 5/1986 | Mahr | |
| 4,593,639 A | 6/1986 | Conrad | |
| 4,604,319 A * | 8/1986 | Evans et al. .................. | 442/164 |
| 4,624,205 A | 11/1986 | Conrad | |
| 4,676,853 A | 6/1987 | Lerma | |

(Continued)

FOREIGN PATENT DOCUMENTS

| | | |
|---|---|---|
| DE | 29 26 476 A1 | 1/1981 |
| DE | 31 19 734 A1 | 12/1982 |

(Continued)

OTHER PUBLICATIONS

U.S. Appl. No. 12/274,163, filed Nov. 19, 2008, Gautier et al.

(Continued)

*Primary Examiner* — Barbara J Musser
(74) *Attorney, Agent, or Firm* — Foley & Lardner LLP

(57) ABSTRACT

The present disclosure relates to methods and compositions useful for the manufacture of sails. Particularly, the present disclosure relates to shaped, reinforced fabrics that can be used to make high-performance, shaped, reinforced sails.

31 Claims, 28 Drawing Sheets

(56) References Cited

U.S. PATENT DOCUMENTS

| | | | |
|---|---|---|---|
| 4,679,519 A | 7/1987 | Linville | |
| 4,708,080 A | 11/1987 | Conrad | |
| 4,731,144 A | 3/1988 | Kommineni et al. | |
| 4,820,568 A | 4/1989 | Harpell et al. | |
| 4,831,953 A | 5/1989 | Conrad | |
| 4,864,953 A | 9/1989 | Allsopp et al. | |
| 4,892,780 A | 1/1990 | Cochran et al. | |
| 4,943,472 A * | 7/1990 | Dyksterhouse et al. | 442/417 |
| 4,945,848 A | 8/1990 | Linville | |
| 5,001,003 A | 3/1991 | Mahr | |
| 5,014,755 A | 5/1991 | Bompard et al. | |
| 5,038,700 A | 8/1991 | Conrad | |
| 5,079,055 A | 1/1992 | Doyle | |
| 5,097,783 A | 3/1992 | Linville | |
| 5,097,784 A | 3/1992 | Baudet | |
| 5,161,479 A | 11/1992 | Mahr | |
| 5,172,647 A | 12/1992 | Towne | |
| 5,304,414 A | 4/1994 | Bainbridge et al. | |
| 5,333,568 A | 8/1994 | Meldner et al. | |
| 5,352,311 A | 10/1994 | Quigley | |
| 5,355,820 A | 10/1994 | Conrad et al. | |
| 5,394,563 A | 3/1995 | Doyle | |
| 5,403,641 A | 4/1995 | Linville et al. | |
| 5,470,632 A | 11/1995 | Meldner et al. | |
| 5,589,254 A | 12/1996 | Dischler | |
| 5,643,522 A | 7/1997 | Park | |
| 6,090,234 A | 7/2000 | Barone et al. | |
| 6,106,649 A | 8/2000 | Slyne | |
| 6,112,689 A | 9/2000 | Baudet | |
| 6,257,160 B1 | 7/2001 | Keire | |
| 6,265,047 B1 | 7/2001 | Chapuis et al. | |
| 6,302,044 B1 | 10/2001 | Baudet | |
| 6,332,420 B1 | 12/2001 | Rodgers | |
| 6,624,098 B1 | 9/2003 | Mahr | |
| 6,725,885 B2 | 4/2004 | Mahr | |
| 6,761,795 B2 | 7/2004 | Chapuis et al. | |
| 6,836,939 B2 | 1/2005 | Guirman et al. | |
| 6,925,950 B2 | 8/2005 | Baudet | |
| 7,051,066 B1 | 5/2006 | Albert et al. | |
| 7,051,666 B2 | 5/2006 | Baudet | |
| 7,479,200 B2 | 1/2009 | Gautier et al. | |
| 2002/0177377 A1 | 11/2002 | Mahr | |
| 2006/0157189 A1* | 7/2006 | Gautier et al. | 156/221 |
| 2007/0218793 A1 | 9/2007 | Rossignol | |
| 2009/0140455 A1 | 6/2009 | Gautier et al. | |
| 2009/0173266 A1 | 7/2009 | Gautier et al. | |
| 2009/0173267 A1 | 7/2009 | Gautier et al. | |
| 2009/0173432 A1 | 7/2009 | Gautier et al. | |
| 2012/0102678 A1 | 5/2012 | Junker et al. | |

FOREIGN PATENT DOCUMENTS

| | | |
|---|---|---|
| EP | 0 056 657 B1 | 7/1982 |
| EP | 0 224 729 A1 | 6/1987 |
| EP | 0 271 215 A1 | 6/1988 |
| EP | 0 281 322 A1 | 9/1988 |
| EP | 0475 083 B1 | 3/1992 |
| EP | 1 705 273 A2 | 9/2006 |
| EP | 1 744 877 A0 | 1/2007 |
| EP | 2179917 A1 | 4/2010 |
| EP | 2189269 A1 | 5/2010 |
| EP | 2298535 B1 | 2/2012 |
| FR | 0 403 787 | 10/2005 |
| GB | 2 016 368 A | 9/1979 |
| GB | 2 280 516 A | 2/1995 |
| GB | 2 313 607 A | 12/1997 |
| JP | 2005290575 A | 10/2005 |
| WO | WO 87/07233 A1 | 12/1987 |
| WO | WO 94/11185 A1 | 5/1994 |
| WO | WO 94/17848 A | 5/1994 |
| WO | WO 96/07532 A1 | 3/1996 |
| WO | WO 01/11185 A | 3/2001 |
| WO | WO 01/17848 A1 | 3/2001 |
| WO | WO 2004/005009 A | 1/2004 |
| WO | WO 2005/102690 A1 | 11/2005 |

OTHER PUBLICATIONS

U.S. Appl. No. 12/274,307, filed Nov. 19, 2008, Gautier et al.
U.S. Appl. No. 12/274,209, filed Nov. 19, 2008, Gautier et al.
U.S. Appl. No. 12/274,214, filed Nov. 19, 2008, Gautier et al.
Communication regarding transmission of the European search report for European Application No. 09175448.1, European Search Report and European Search Opinion sent to foreign agent on Mar. 30, 2010, 5 pages.
Communication regarding transmission of the European search report for European Application No. 09176973.7, European Search Report and European Search Opinion sent to the foreign associate on Mar. 30, 2010, 4 pages.
Extended Search Report for EP10185558.3, mail date Feb. 14, 2011, 4 pages.
Office Action for U.S. Appl. No. 10/521,160, mail date Jun. 27, 2007, 5 pages.
Amendment and Reply for U.S. Appl. No. 10/521,160, mail date Dec. 21, 2007, 48 pages.
Office Action for U.S. Appl. No. 10/521,160, mail date May 29, 2008, 7 pages.
Notice of Allowance for U.S. Appl. No. 10/521,160, mail date Sep. 16, 2008, 4 pages.
Office Action for U.S. Appl. No. 12/274,163, mail date Dec. 21, 2010, 10 pages.
Amendment and Reply for U.S. Appl. No. 12/274,163, mail date Mar. 21, 2011, 16 pages.
Amendment and Reply for U.S. Appl. No. 12/274,307, mail date Mar. 22, 2011, 13 pages.
Office Action for U.S. Appl. No. 12/274,209, mail date May 25, 2012, 6 pages.
International Search Report for PCT/CH03/00415, issued Sep. 9, 2003.
International Search Report for PCT/US2009/065174, issued Mar. 28, 2011.
Final Office Action for U.S. Appl. No. 12/274,307, mail date Jun. 9, 2011, 11 pages.
Interview Summary for U.S. Appl. No. 12/274,307, mail date Jul. 27, 2011, 4 pages.
Office Action for U.S. Appl. No. 12/274,307, mail date Sep. 9, 2011, 11 pages.
Office Action for U.S. Appl. No. 12/274,209 mail date May 18, 2011, 6 pages.
Office Action for U.S. Appl. No. 12/274,209 mail date Oct. 13, 2011, 6 pages.
Office Action for U.S. Appl. No. 12/274,214 mail date May 18, 2011, 7 pages.
Final Office Action for U.S. Appl. No. 12/274,214 mail date Oct. 12, 2011, 6 pages.
Interview Summary for U.S. Appl. No. 12/274,214 mail date Oct. 12, 2011, 2 pages.
Interview Summary for U.S. Appl. No. 12/274,214 mail date Nov. 30, 2011, 3 pages.
Office Action for U.S. Appl. No. 12/274,163, mail date Sep. 8, 2011, 11 pages.
Final Office Action for U.S. Appl. No. 12/274,163, mail date Jun. 8, 2011, 13 pages.
Office Action for U.S. Appl. No. 12/274,163, mail date Mar. 6, 2012, 7 pages.
Interview Summary for U.S. Appl. No. 12/274,163, mail date Dec. 1, 2011, 3 pages.
Interview Summary for U.S. Appl. No. 12/274,163, mail date Jul. 27, 2011, 4 pages.
Office Action for U.S. Appl. No. 12/274,163, mail date Dec. 21, 2010, 11 pages.
Office Action for U.S. Appl. No. 12/274,307, mail date Mar. 7, 2012, 9 pages.
Interview Summary for U.S. Appl. No. 12/274,307, mail date Dec. 1, 2011 3 pages.
Office Action for U.S. Appl. No. 12/274,307, mail date Dec. 22, 2010, 8 pages.
Interview Summary for U.S. Appl. No. 12/274,209, mail date Mar. 26, 2012, 3 pages.

Office Action for U.S. Appl. No. 12/274,209, mail date Jan. 24, 2012, 10 pages.
Interview Summary for U.S. Appl. No. 2/274,209, mail date Nov. 30, 2011, 3 pages.
Interview Summary for U.S. Appl. No. 12/274,209, mail date Oct. 13, 2011, 8 pages.
Interview Summary for U.S. Appl. No. 12/274,209, mail date Aug. 3, 2011, 3 pages.
Issue Notification for U.S. Appl. No. 12/274,214, mail date May 2, 2012, 1 page.
Notice of Allowance for U.S. Appl. No. 12/274,214, mail date Jan. 24, 2012, 7 pages.
Interview Summary for U.S. Appl. No. 12/274,214, mail date Aug. 3, 2011, 3 pages.
Response to International Search Report for EP 09175448.01, dated Jun. 21, 2011, 10 pages.
Office Action for EP 09175448.1, dated Aug. 5, 2011, 5 pages.
Communication about intention to grant, EP 10185558.3, dated Jul. 22, 2011, 4 pages.
Communication about intention to grant, EP 09176973.7, dated Feb. 11, 2011, 4 pages.
Definition of sail. Merriam Webster Dictionary, Tenth Edition, 1988, 3 pages.
Gustafsson, Peter, "North Sails 3Di English version", www.blur.se/2010/04/26/north-sails-3di-english-version/, Apr. 26, 2010, 12 pages.
Green, Sharon, "3Di Unmasked", Seahorse, pp. 42-45. No Date Available.
Boyd, James, "North Sails 3Di (part one)", The Daily Sail, www.thedailysail.com/inshores/10/55848/north-sails-3di, Jun. 25, 2010, 6 pages.
Boyd, James, "The 3Di revolution (part 2)", The Daily Sail www.thedailysail.com/inshore/10/55878/3di-part-two, Jun. 29, 2010, 5 pages.

* cited by examiner

METHOD OF PRODUCING SAILS USING REINFORCED, FORMED FABRICS

CROSS-REFERENCE TO RELATED PATENT APPLICATIONS

This application is a continuation-in-part of U.S. application Ser. No. 10/521,160 now U.S. Pat. No. 7,479,200 which is the U.S. National Stage of PCT/CH03/00415, filed Jun. 25, 2003, which claims priority to Swiss Patent document CH 1150/02, filed Jul. 2, 2002, all of which are incorporated herein by reference in their entirety.

BACKGROUND

When in use, sails undergo directional forces along load lines, at or between eyelets, and along the leech and luff. Accordingly, reinforcements may be necessary to distribute the forces, maintain the shape of the sail and to avoid damaging the sail, such as by stretching or tearing.

In many cases, it is also necessary for the fabric to have particular shapes in three dimensions whether for reasons of performance or aesthetics.

Such high-performance, reinforced and shaped sails may be subject to several parameters including commercial criteria. Such criteria may include a fabric that is high-performance (e.g., maintains shape and integrity), is lightweight, and of course, is priced as low as possible.

Many sail-making methods and sail fabrics are known; however, there are some drawbacks.

A basic drawback to many of the known, high-performance reinforced and shaped fabrics presently used for sail manufacture is that the structure of the fabric includes at least three components: 1) a top sheet; 2) reinforcing elements; and 3) a bottom sheet. In general, the reinforcing elements are bonded in a sandwich between the two cover sheets (e.g., polymerized plastic sheets). This type of fabric construction is not only expensive, it is also relatively heavy. Moreover, materials used to form the top and bottom layers, such as polymerized plastic sheets, are semi-rigid and may not allow local deformations.

Some sail manufacturing methods use a mold to create a sail with a three-dimensional shape over the entirety of the sail. Consequently, a mold the same size as the sail is required. Additionally, because the reinforcing yarns are generally positioned as one single piece, the placement of the elements can be very tricky.

Other known methods of sail manufacture include assembling several fabric panels from different cuts, the panels being assembled together by sewing or bonding. With these methods, the seams are fragile and often require reinforcing panels themselves, added by more sewing or boding. Such additional reinforcing panels add to the overall weight of the sail. Moreover, at the location of seams and reinforcing panels, the sail is less flexible than at other regions, which can cause creases, and then fatigue, when the sail takes the desired shape. Such creases are not only unsightly, but also reduce the performance and life of the sail.

SUMMARY

The present disclosure relates to methods of manufacturing shaped and reinforced fabrics, and more particularly to methods of manufacturing sails using such fabrics. Generally, the fabrics comprise composite elements which comprise a cured or hardened resin encasing reinforcing elements, such as yarns, but do not include outer layers of film or cover sheets. The fabrics may also have film or other materials sandwiched between layers of yarns. These elements can be shaped in three dimensions, including on a mold, so that a sail formed from the fabric also has a desired shape in three dimensions.

One method of manufacturing the novel shaped and reinforced fabric comprises carrying out the manufacture of the fabric continuously. A press of small width compared with the length of the fabric successively presses the constituent elements of the fabric. Reinforcing elements, yarns for example, are prepared on a belt which is disposed able to move on a preparation table and discontinuous reinforcing elements are disposed overlapping the waiting part of the fabric already pressed. The reinforcing elements can thus be disposed in all directions according to the direction and magnitude of the forces to which the fabric may be subjected. The upper and lower chambers of the press comprise movable and adjustable devices which make it possible to obtain, during pressing, a desired shape in three dimensions at desired locations. By successive forward movements of the fabric and depending on the adjustments, the fabric can have flat portions or have portions in three dimensions, and the shape of the portions in three dimensions can be varied quickly according to the final shape provided for the fabric. The elements that constitute the fabric include yarns which are encased by a membrane; the membrane comprises a hardened or cured resin. Before pressing, these elements are in the form of strips which can be constituted by a prepreg of resin and yarns, the preimpregnation having the advantage of holding the yarns. Once pressed, the fabric is comprised of the membrane which is the resin which encases the yarns or rather the filaments of the yarns. In some embodiments, the yarns are made up of thousands of filaments which are distributed over the width of each strip. During preparation, part of each strip is placed on the juxtaposed strips and during pressing the filaments of the different strips intermix so as to constitute a homogeneous and impervious fabric for example.

The principles of manufacture, fabrics and sails described herein have many advantages. One of the advantages is that the fabric once completed comprises two main components, these being the membrane (e.g., hardened or cured resin) and the reinforcing filaments. Consequently, sails constructed using such fabrics are lighter in weight and lower in cost compared to sails manufactured using the three-layer "sandwich" construction or the sewn/bonded panel construction.

The fact that the completed fabric is in the form of a membrane encasing thousands of intermixed filaments makes it possible to obtain a highly homogeneous fabric, with no creases, and with reinforcements (formed by the reinforcing elements) which make it possible to withstand all the forces to which the fabric may be subjected. The membrane and the filaments also have the advantage of being practically indeformable in the direction of the force while being highly flexible, during folding of the fabric for example.

The press has a very small space requirement compared with the dimensions of fabrics to be manufactured which makes it possible to install it in premises of small dimensions.

A shaping device integrated with a press makes it possible to obtain portions of fabric in three dimensions, which makes it possible to obtain a finished fabric in three dimensions. Such an integrated device has many advantages. One of these advantages is that the shaping device makes it possible to eliminate expensive tools such as the three-dimensional molds. This is because the shaping device can allow a multitude of different shapes to be obtained by simple and very quick adjustments.

This is advantageous during the manufacture and the development of new fabrics having new shapes. For example, the set-up for a new sail shape or design can be provided quickly by simple adjustments with the integrated device. The new sail can then be quickly made, tested and modified as necessary.

Thus, the methods and fabrics described herein make it possible manufacture higher performance sails at reduced costs.

The accompanying figures illustrate schematically and by way of example fabric and sail embodiments and methods described herein.

The present disclosure is also directed to methods of manufacturing a sail, without a press, and using a shaped mold, such as the mold disclosed in U.S. Pat. No. 5,097,784, which is incorporated by reference herein in its entirety. Generally, strips formed from resin and filaments are positioned onto a first surface to form panels, and the panels are then positioned onto a shaped mold such that adjacent panels are overlapping. In other embodiments, the strips are positioned directly onto a shaped mold. Once on the mold, the positioned strips are subject to heat and pressure. The heat and pressure join the strips, thereby forming a shaped fabric. The shaped fabric can then be used to form a sail.

In some embodiments the strips are formed of filaments and resin. That is, the yarns (reinforcing elements) are separated into component filaments, and the application of resin or glue forms the strips. Because the yarns are already separated into filaments, less heat and pressure are required, as compared to the method described above, using a press, to cause the strips to form a homogeneous fabric.

The filaments that make up the strips may be formed from a number of different yarns. For example, in some embodiments, the filaments are formed from carbon, aramid, polyester and combinations thereof. Additionally, filaments of different dimensions may be used (e.g., different widths). In further embodiments, the strips may comprise a single type of filament or a plurality of filament types.

In some embodiments, heat and pressure are applied simultaneously. In other embodiments, heat and pressure are applied serially. In some embodiments, pressure is applied by forming a vacuum bag over the positioned strips (e.g., panels) on the mold, and applying a vacuum. In some embodiments, the pressure is applied to about 1800 pounds per square foot. In still other embodiments, heat is applied by running a heat blanket over the positioned strips.

In some embodiments, strips are positioned on the mold such that the filaments of the strips are generally parallel to the lines of force to which the sail will be subjected. In other embodiments, strips are positioned in a location on the sail that is predicted to require reinforcement. Corners of sails (i.e., head, tack and clew), at or between eyelets, and along the leech and luff are examples of such locations. For example, strips may be positioned such that the filaments of the positioned strips extend outwardly from the corner of a sail in a generally non-parallel orientation (e.g., along predicted load lines). In some embodiments, strips may be positioned to partially or completely overlap other strips, run perpendicular to other strips and/or run parallel to other strips.

DETAILED DESCRIPTION

In the following section, methods of forming reinforced and shaped fabrics are described. Section I relates to forming shaped and reinforced fabrics using a press. Section I also relates to various press embodiments and methods of forming fabrics and sails using such press embodiments. Section II relates to methods of forming fabrics using shaped molds; no press is required.

The present disclosure uses several terms, as defined below.

As used herein "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

As used herein, the term "yarn" refers to an untwisted assemblage of fibers or filaments (also called "reinforcing elements" herein), either natural or man-made, combined together to form a continuous strand. As used herein, the terms "filament," "fiber" and "reinforcing element" are used interchangeably.

As used herein, the terms "tape" and "strip" are used interchangeably and refer to a tape or strip formed mainly of a resin or glue and yarns (reinforcing elements) or filaments. Generally, the reinforcing elements or filaments of a tape run lengthwise through the tape. A single tape may include a single type of yarn or filament (e.g., carbon only), or yarns made up of different types of materials spread into filaments (e.g., a combination of one or more of carbon, aramid, polyester, polyamide, liquid crystal polymer (e.g., Vectran), ultra high molecular weight polyethylene (UHMWPE, e.g., Dyneema, Spectra), poly-p-phenylenebenzobisoxazole (PBO), M5 fiber (developed by Akzo Nobel), nylon, and rayon). Tapes may also be formed using a single type of glue or resin, or a combinations of glues or resins. Other components may also be added to the tapes. By way of example, but not by way of limitation, ultraviolet protectants, moisture protectants, lubricants or anti-abrasion agents, antioxidants, mildew and mold protectants, hardeners, dyes, carbon and fiberglass may be added to the tapes. In some embodiments, the tapes include a mesh or nonwovens or scrim overlapping or sandwiching the filaments.

As used herein, the term resin or glue are used interchangeably. Examples of resins and glues include, but are not limited to thermoplastic and thermoset glues or resins such as provided in the table below:

| Producer | Name | Thermoset/thermoplastic |
| --- | --- | --- |
| EMS | 2AS | Thermoplastic |
| Schmits | Bemicoll X00-109 | Thermoset |
| Schmits | Bemithane ALW | Thermoset |

I. Method of Forming Shaped and Reinforced Fabric Using a Press

Figure 1:
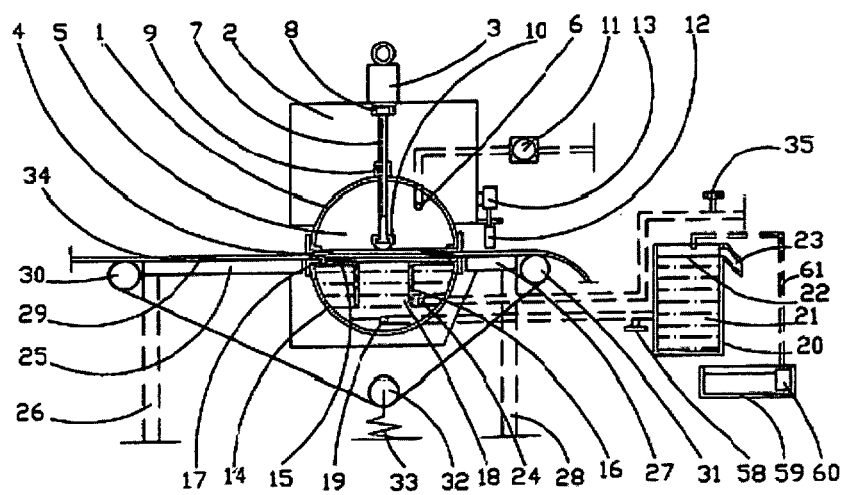
FIG. 1 is an overall side view of the press and the various elements attached to a press.

With reference first to FIG. 1, a press is constituted by an upper chamber 1 and a lower chamber 14. The lower chamber 14 comprises L-shaped angle irons 15 and 16. The upper part of the lower chamber 14 comprises a flexible element 17 (a silicone membrane for example) which is mounted hermetically on the lower chamber 14. The lower chamber 14 is filled with water 18 which is brought via a water inlet 24. The water inlet is controlled by a valve 35. The lower chamber comprises a water outlet 19 which is a balancing outlet. The water outlet 19 is connected by a duct to a tank 20 which contains water 21. The tank comprises a water overflow 23 which determines the height of the water level 22. The height of the water level 22 is provided to be at the level of the lower face of the flexible element 17. The water level in the lower chamber is thus controlled by the communicating vessels principle. A valve 58 is mounted between the water outlet 19 and the tank 20. Closing of the valve 58 makes it possible to block off the water circulation and annul the communicating vessels principle. A balancing tank 59 is placed under the overflow 23. When water overflows via the overflow 23 into the balancing tank 59, the surplus water in the balancing tank is constantly taken back into the tank 20 via a duct 61 which is connected to a pump 60. The upper chamber 1 is closed off in its lower part by a flexible element 4 which is mounted hermetically with the upper chamber. The upper chamber contains air 5 which is brought via an air inlet 6. The pressure of the air is controlled by a manometer 11. The upper chamber 1 comprises reinforcing elements 2. A metal girder 3 is mounted on the reinforcing elements, the whole being assembled by welding for example. The metal girder 3 is connected to an actuator or to any mechanical device whatsoever making it possible on the one hand to lift up the chamber during the preparation operations or to apply a pressure downwards during the pressing operation. A yarned rod 7 which comprises an activation nut 8 cooperates with a tapped element 9 which is mounted on the upper chamber. The lower end of the rod is connected with play to a shaping bar 10. A preparation table 25 is mounted on feet 26 and a receiving table 27 is mounted on feet 28. A conveyor belt 29 is mounted able to move on the tables and on the flexible element 17 of the lower chamber 14. The conveyor belt is supported by two fixed rollers 30 and 31 and by a movable roller 32 which is subject to the action of a draw spring 33 which adjusts the tension of the conveyor belt 29 according to the deformations thereof. The reinforced strips 34 which constitute the fabric once the pressings have been performed are prepared on the conveyor belt, and then pass under the press and come out in the form of a fabric constituted by a membrane which encases filaments.

Figure 2:
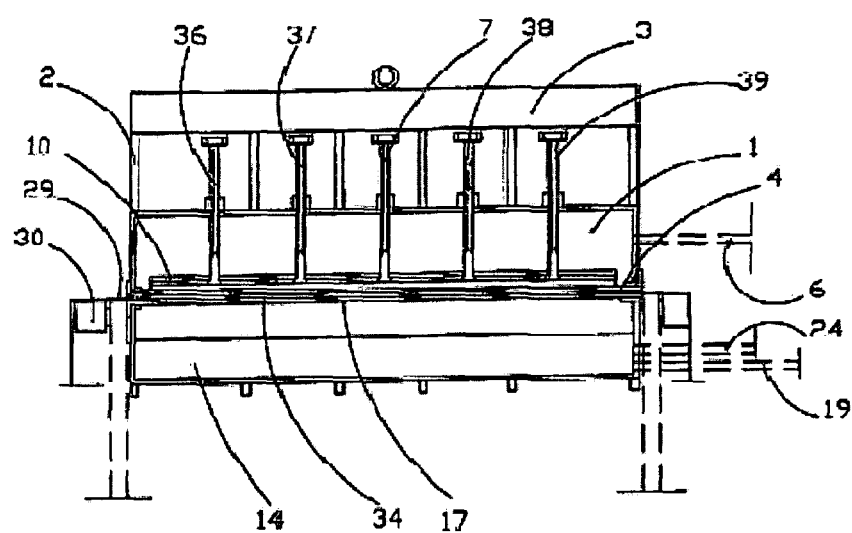
FIG. 2 is a front view of the press with a shaping device.

FIG. 2 shows in a front view the yarned rods 36, 37, 7, 38, 39, which are connected in their lower part to the shaping bar 10. The shaping bar is not fixed to the rods in its longitudinal direction, but is mounted able to move so that when the shaping bar is deformed the tensions on it can be absorbed. FIG. 2 shows the metal girder 3, the upper chamber 1 in which the shaping bar is installed and the reinforcing elements 2 of the upper chamber, the flexible elements 4 and 17, the water inlet 24, the balancing water outlet 19, the air inlet 6, the lower chamber 14, the conveyor belt 29 and the roller 30 and the reinforced strips 34.

The position shown in FIGS. 1 and 2 is the flat pressing position in which the shaping bar is in the inactive position. In this position, the water in the lower chamber is kept at its level by the communicating vessels principle and then the valve 58 is closed, and the air contained in the upper chamber is put under pressure, at a pressure value which is determined by the kind of resin of the reinforced strips.

During the pressing, the resin must be heated to or activated at a temperature determined by the kind of resin. Several heating possibilities can be provided according to FIG. 1. One possibility is heating of the air contained in the upper chamber. One possibility is heating of the water contained in the lower chamber. One possibility is heating of the preparation table just before the reinforced strips are moved under the press.

For the case where the heating is not obtained by the preparation table, this table is in any case heated to a certain temperature necessary for a slight adhesion of the reinforced strips in order to facilitate the putting down of these strips.

FIG. 1 shows an immobilizing element 12 which is activated by an immobilizing actuator 13. In the position of movement of the conveyor belt, the immobilizing element is inactive.

In practice, the first reinforced strips are disposed on the preparation table. Once the reinforced strips have been put down, the conveyor belt places these first reinforced strips under the press, the upper chamber is moved towards the base until contact with pressure is made on the lower chamber, by heating and the air pressure in the upper chamber the reinforced strips are converted into a membrane encasing filaments, the whole constituting an impervious or pervious fabric. One or both chambers are cooled, thus cooling the membrane. Movement of the reinforced strips by the conveyor belt leaves a portion of the strips on the preparation table for connection with the second series of reinforced strips. During the time of pressing the first reinforced strips, the second strips are disposed on the preparation table and when the operation of pressing the first reinforced strips is accomplished, the air pressure is reset to ambient pressure, the upper chamber is lifted up and the second reinforced strips are placed under the press. The manufacturing time for a fabric is determined by the time necessary for heating of the reinforced strips and cooling. By way of example, according to the resins used, the pressing time can be limited to a few minutes which are necessary in any case for disposition of the next reinforcing strips.

Figure 3:
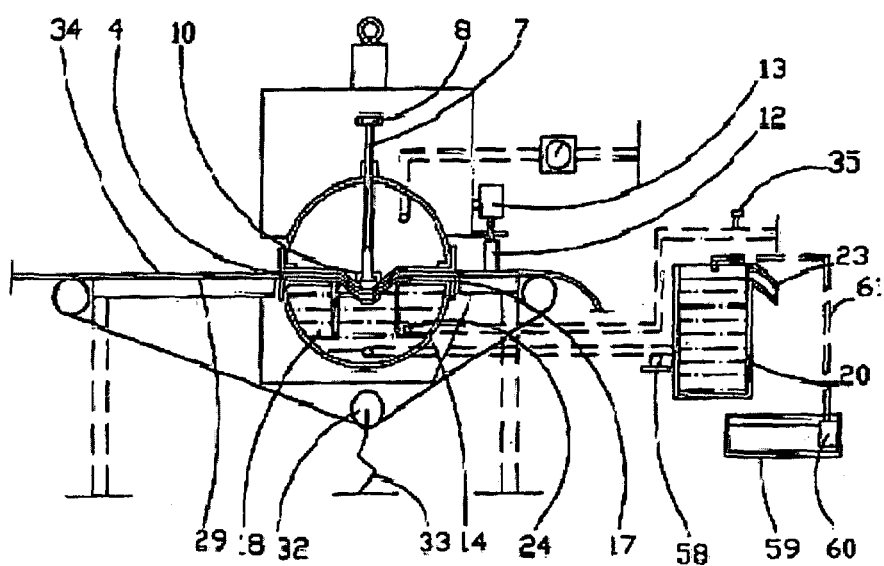
FIG. 3 is an overall side view of the press with the shaping device in the shaping position.
Figure 4:
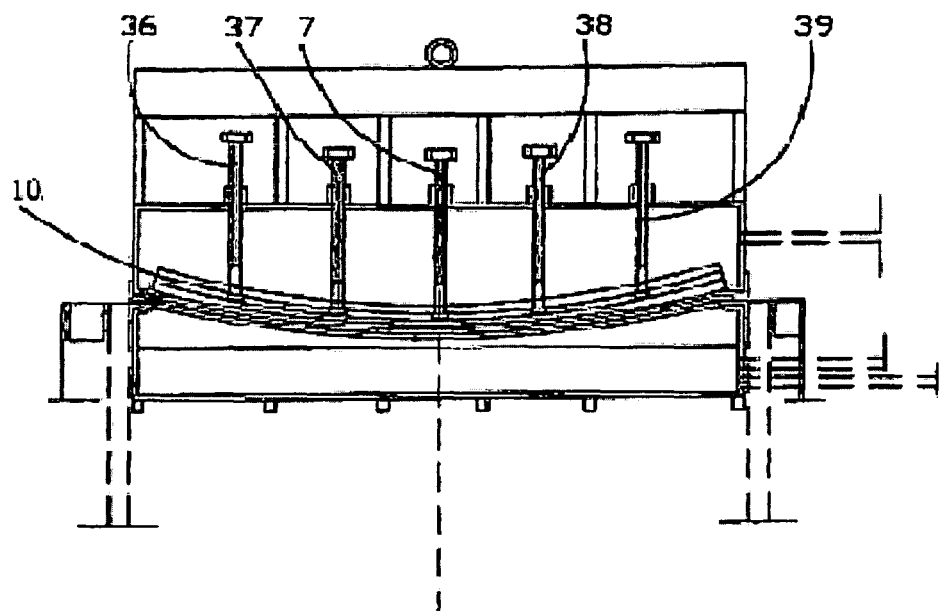
FIG. 4 is a front view of the press with the shaping device in the shaping position.

FIGS. 3 and 4 show the pressing of a portion of reinforced strips with shaping in three dimensions. In this case, when the reinforced strips 34 are installed under the press, the rods 36, 37, 7, 38, 39, are activated, for example by means of nuts such as the nut 8 so as to give an arc shape to the bar 10. The immobilizing element 12 is activated by the immobilizing actuator 13 and immobilizes the portion of fabric already completed. In this way, the yarns of the reinforced strips can take the shape provided for, and therefore the resulting difference in length of the third dimension.

During the pressing with shaping, the flexible elements 4 and 17 and the conveyor belt 29 also take the chosen shape. The movable roller 32 moves upwards while maintaining the tension in the conveyor belt by the spring 33. The shaping position, and therefore the movement of the shaping bar 10 downwards, reduces the volume of the lower chamber 14 and the excess water 18 can leave via the water outlet which goes into the tank 20 and overflows via the overflow 23. The valve 58 is closed immobilizing the quantity of water in the chamber 14, and the air 5 is put under pressure.

When the pressing is complete, the shaping bar is replaced into the inactive position, the valve 58 is opened, the water is put back to its level by the pump 60 which takes the excess water contained in the balancing tank 59 back into the tank 20 via the duct 61. The other pressing operations are identical to the flat pressing operations.

In practice and with the aim of obtaining the desired finished fabric shape in three dimensions, some portions of the fabric are pressed flat, and others with various shapes of the shaping bar.

Figure 5:
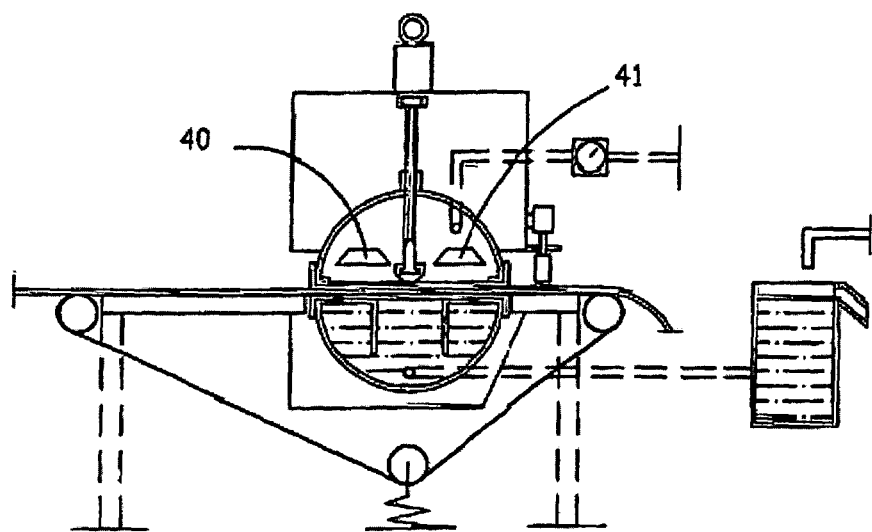
FIG. 5 is a view of the press with an infrared heating device.

FIG. 5 shows another heating possibility with infrared heating elements 40 and 41 which are disposed in the upper chamber.

Figure 6:
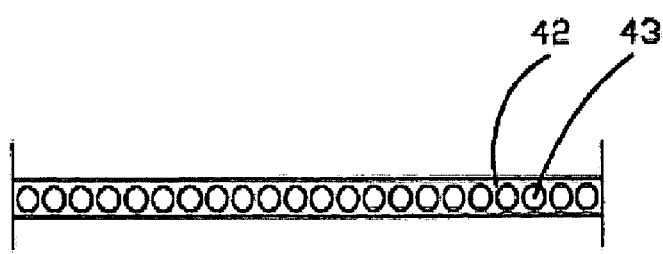
FIG. 6 is a sectional view of a membrane encasing yarns disposed unidirectionally.

FIG. 6 shows a portion of fabric with the membrane 42 which encases the yarns 43 disposed unidirectionally. In practice and after pressing, the yarns are in fact constituted by thousands of filaments.

Figure 7:
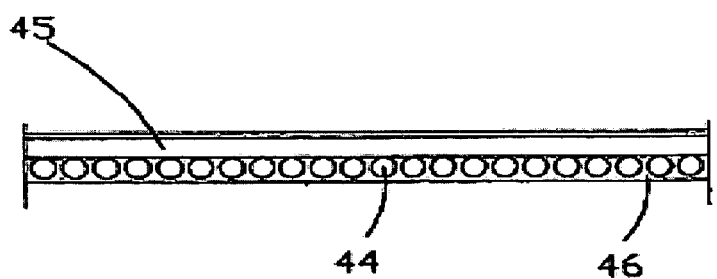
FIG. 7 is a sectional view of a membrane encasing yarns disposed multidirectionally.

FIG. 7 shows a portion of fabric with the membrane 46 encasing warp yarns 44 and weft yarns 45 multidirectionally.

Figure 8:
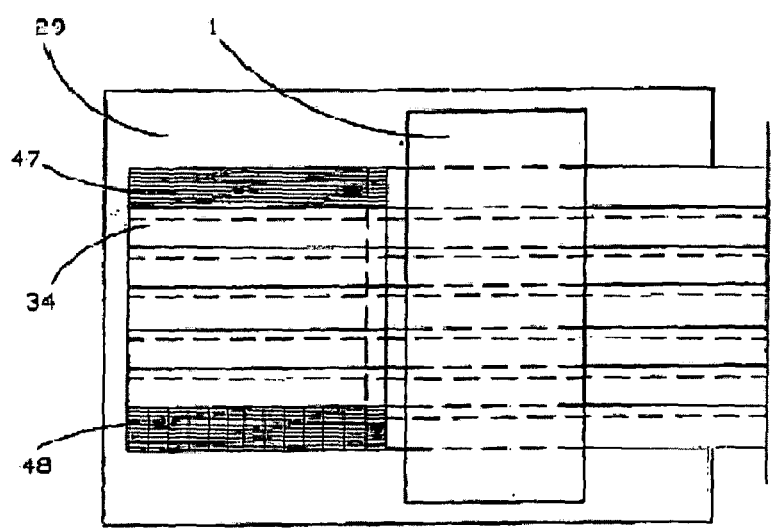
FIG. 8 is a plan view of strips before pressing.

FIG. 8 shows in plan view the reinforced strips 34 which are disposed on the conveyor belt 29 which is placed on the preparation table with passage under the press depicted in this figure by the upper chamber 1. FIG. 8 shows different sorts of unidirectional 47 or bidirectional 48 reinforced strips which can be used by way of example.

Figure 9:
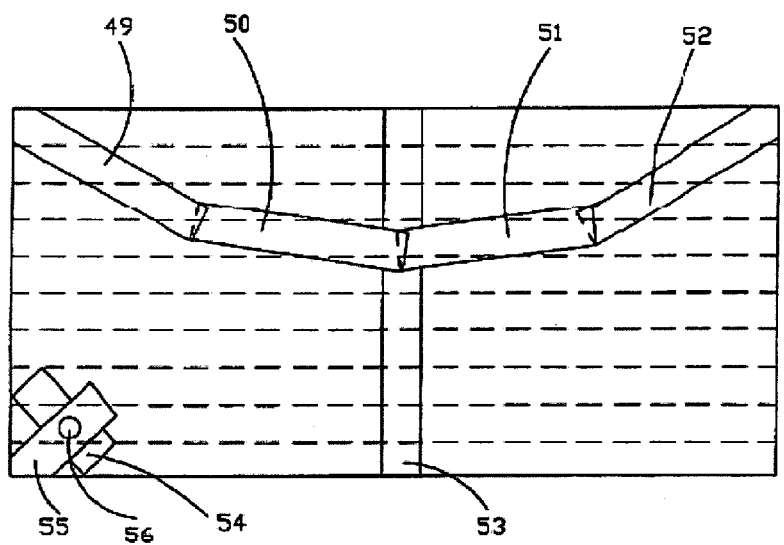
FIG. 9 is a plan view of a fabric with strips disposed in different directions.

FIG. 9 is a plan view of a fabric which shows a few example possibilities of disposition of reinforced strips, that is the reinforced strips 49, 50, 51, 52, which make it possible to obtain strength in an arc, the strip 53 which has a reinforcement at 90°, or strips 55 and 54 which can be disposed at the location of an eyelet 56 for example.

Figure 10:
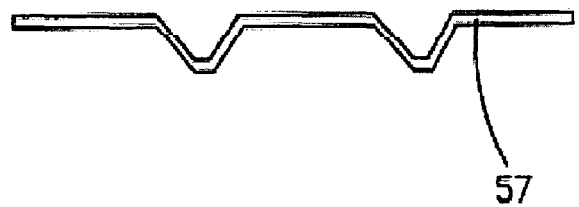
FIG. 10 is a sectional view of portions of fabric shaped in three dimensions.

FIG. 10 shows a sectional view of a fabric with portions deformed in three dimensions according to FIG. 4 in the non-taut position.

Figure 11:
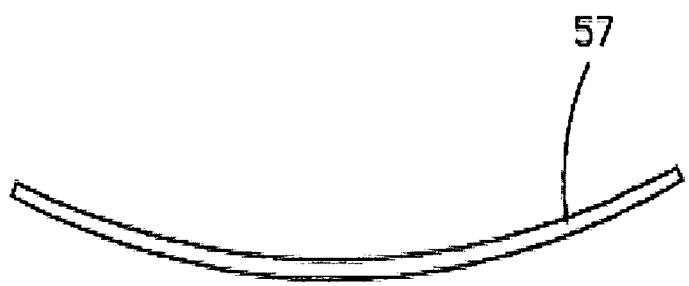
FIG. 11 is a sectional side view of a spread-out fabric.

FIG. 11 shows the three-dimensional shape taken by the fabric when it is taut.

The various activation elements, the yarned rods, the movements of the upper chamber, the forward movement of the conveyor belt, the immobilizing element, opening and closing of the water supplies and outlets, switching on and off of the heating, and the air pressure, can be obtained by electric motors, step-by-step motors for example, actuators, valves or electrical controls. Each of these elements can be connected to a computer whose program manages the activation. It is also possible to dispose the reinforced strips by a transport and placing device which can also be managed by the computer program.

In this way, the manufacture of the fabric can be fully automatic.

There are numerous uses for fabrics in three dimensions, and these fabrics can be used in all cases requiring light, very strong and three-dimensional fabrics.

II. Method of Forming Shaped and Reinforced Fabric Using a Three-Dimensional Mold In the following section, another method of forming reinforced and shaped fabrics is described. In this section, methods are described in the context of sail manufacture. It is understood, however, that the same methods can be applied to shaped, reinforced fabrics for other uses.

In this example, a three dimensional sail pattern is created, using for example, conventional computer design programs, such as computer-aided design (CAD) and computer-aided engineering (CAE) software. Once a pattern is established, the software is then used to create a specific mold design to form the sail according to the pattern. The mold design information is then used to shape a mold (e.g., an articulating, moveable mold) into the proper shape. For example, a mold may be controlled by actuators via a computer program. Once formed, the mold surface is then evaluated to verify the accuracy of the shape.

In some embodiments, the sails are formed from multiple panels, with each panel formed from multiple, overlapping strips or tapes. As described above, the tapes are made up of yarns, such as carbon or aramid yarns, that have been spread out into filaments. The filaments are held together by a coating of resin or glue.

Similar to the method described in Section I, the panels are positioned to overlap adjacent panels, and adjacent panels are joined together by applying heat and pressure, allowing the glue and filaments from adjacent and overlapping strips of the panels to intermix. In this embodiment, however, instead of using a press, the panels are positioned on a three-dimensional, sail-shaped mold so that the final sail, or a region of the sail (depending on the size of the mold) will have the same or similar three-dimensional shape as the mold.

Generally, the mold is the size and shape of the finished sail. In some embodiments, the mold is deformable and its shape can be altered to have the desired shape and contours of the finished sail. Additionally, in some embodiments, the mold is configured to be heated or to provide heat, and to be subject to a vacuum pressure or to provide a vacuum.

For example, in some embodiments, once the panels are positioned on the mold, a vacuum bag is formed over the positioned panels on the mold, and a combination of heat and pressure is used to meld the tapes of the panels into a contiguous piece of fabric.

The method is described in more detail below, and is broken down into the following steps: A) tape creation; B) tape lay-up and panel formation; and C) assembling panels. Section D) describes forming panels, or the entire sail, directly onto a mold.

A. Tape Creation

The sails disclosed herein are formed mainly of tapes made up of glue and yarns, such as aramid or carbon. The yarns are spread out into filaments and the filaments are coated with glue to form the tapes. By way of example, but not by way of limitation, the formation tapes including carbon and aramid is described below.

1. Carbon Tapes

Figure 12:
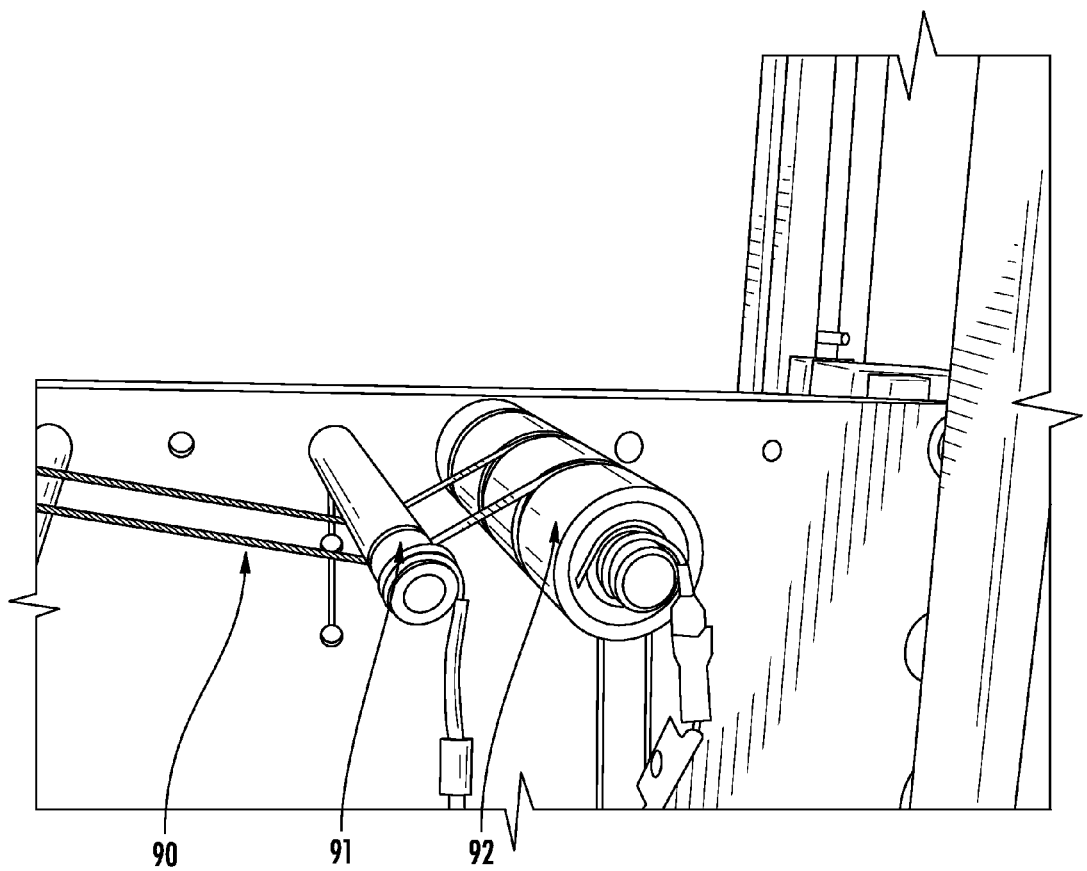
FIG. 12 shows a seizing station in which seizing is burned off of commercially available carbon yarns prior to tape formation.

In some embodiments, the carbon yarns used in the present methods are readily commercially available (e.g., Grafil 34 24K 0.7% A from Grafil, Inc., Sacramento, Calif.). Generally, manufacturers of such carbon yarns apply a seizing to the yarns, causing the filaments that make up the yarns to better adhere to one another. In some embodiments, this seizing must first be removed from carbon yarns, as the seizing can detrimentally affect spreading of the yarns into filaments. A seizing station, such as the one shown in FIG. 12, can be used to remove the seizing from carbon yarns. The seizing station includes two electrified rollers 91 and 92. The carbon yarn 90 is tensioned and in contact with both rollers. As carbon is conductive, the seizing can be burned off the yarn using low voltage (~12 volts) applied to the yarn through the rollers.

Figure 13:
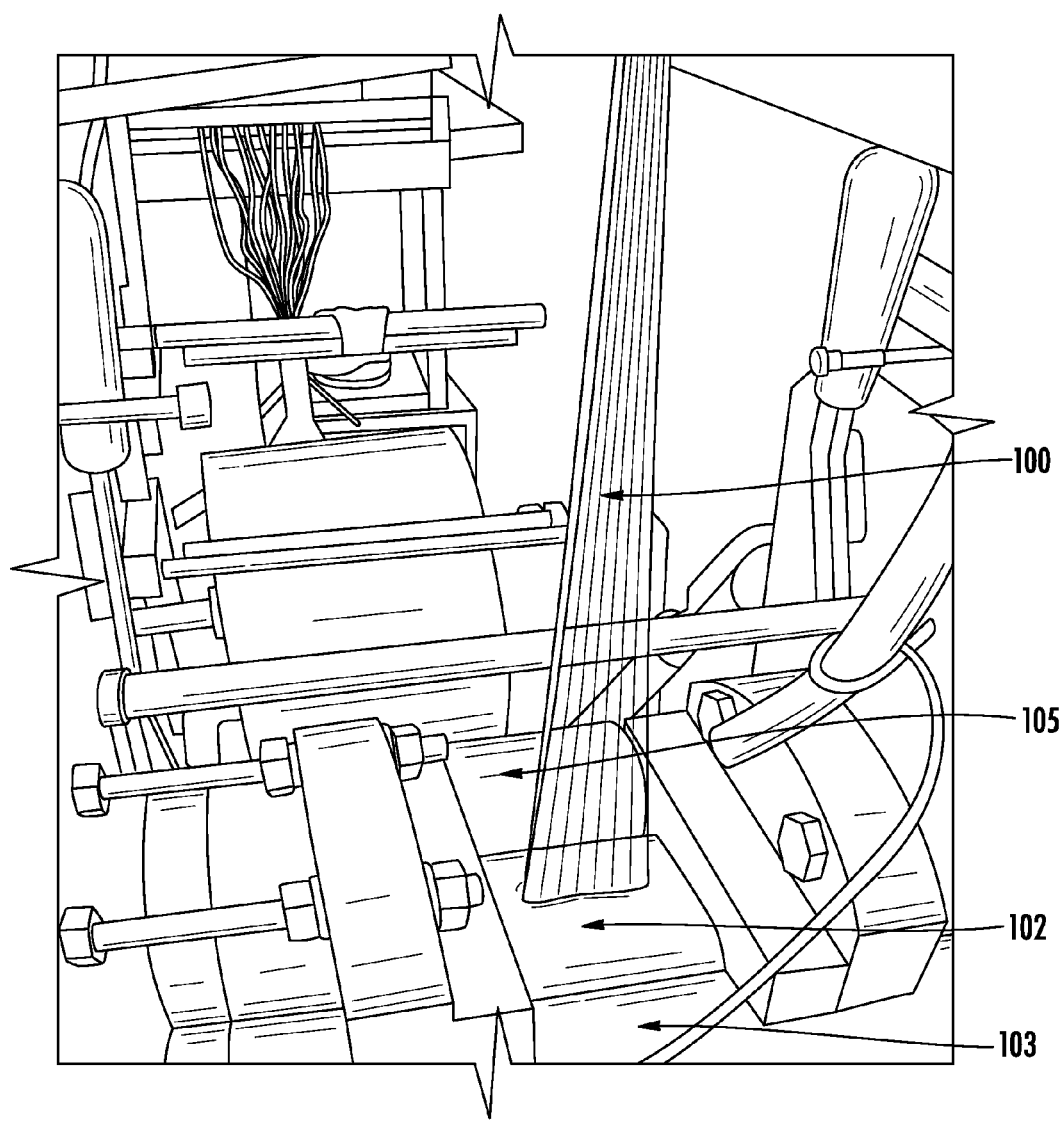
FIG. 13 shows a spreading and glue station in which carbon yarns are separated into filaments and coated with glue to form carbon tapes.
Figure 14:
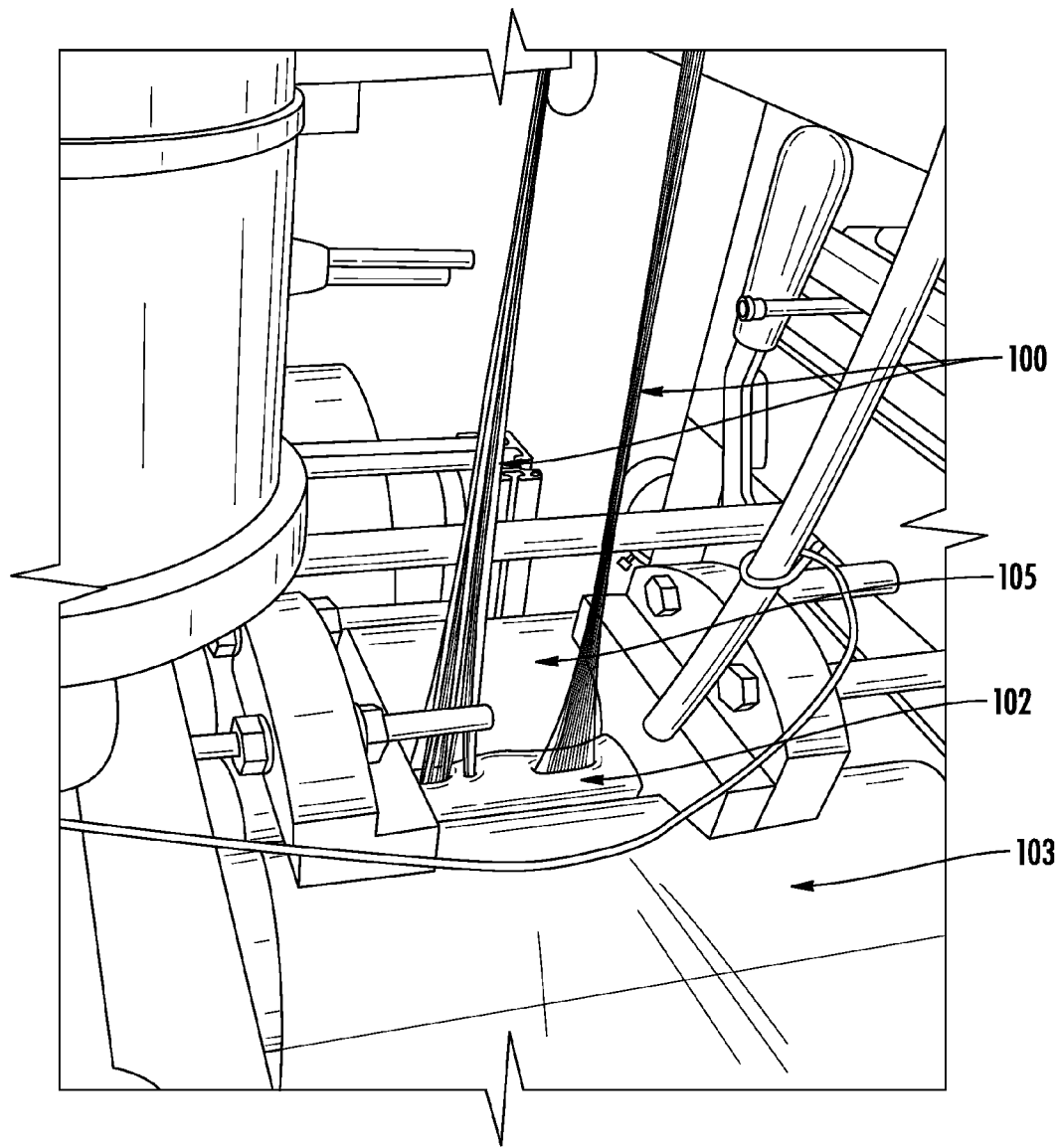
FIG. 14 shows a spreading and glue station in which multiple carbon yarns are separated into filaments and coated with glue to form carbon tapes.

Once the yarn has been prepared by removing the seizing, the yarns are spread apart into filaments and coated with glue at a spreading and glue station. Referring to FIG. 13, glue 102 is pooled between two rollers, 103 and 105 of the spreading and glue station. The rollers 103 and 105 rotate in opposite directions, toward each other. Carbon yarns 100 are threaded between the rollers 103 and 105 and tensioned. Glue 102 is added, and the carbon yarn 100 is then rolled through glue 102 and between rollers 103 and 105. As shown in FIG. 13, the carbon yarns 100 begin to separate into filaments before entering the glue pool 102. Referring to FIG. 14, more than one yarn 100 may be threaded through rollers 103 and 105, and processed through glue 102 of a spreading and glue station. As the glue dries on the separated filaments, the carbon tapes are formed.

2. Aramid

Figure 15:
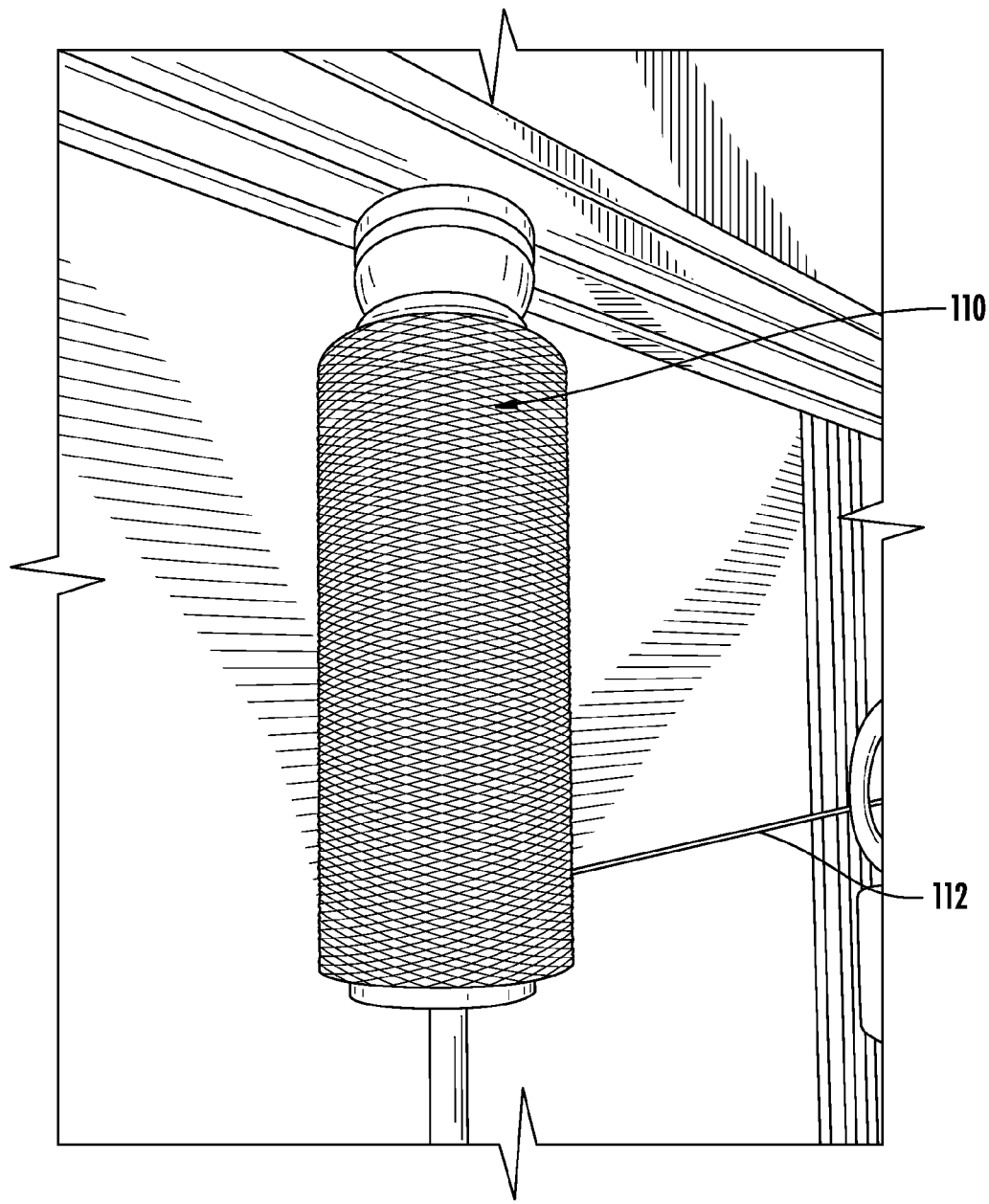
FIG. 15 shows an unspooling and unwinding station in which yarns are unwound prior to tape formation.
Figure 16:
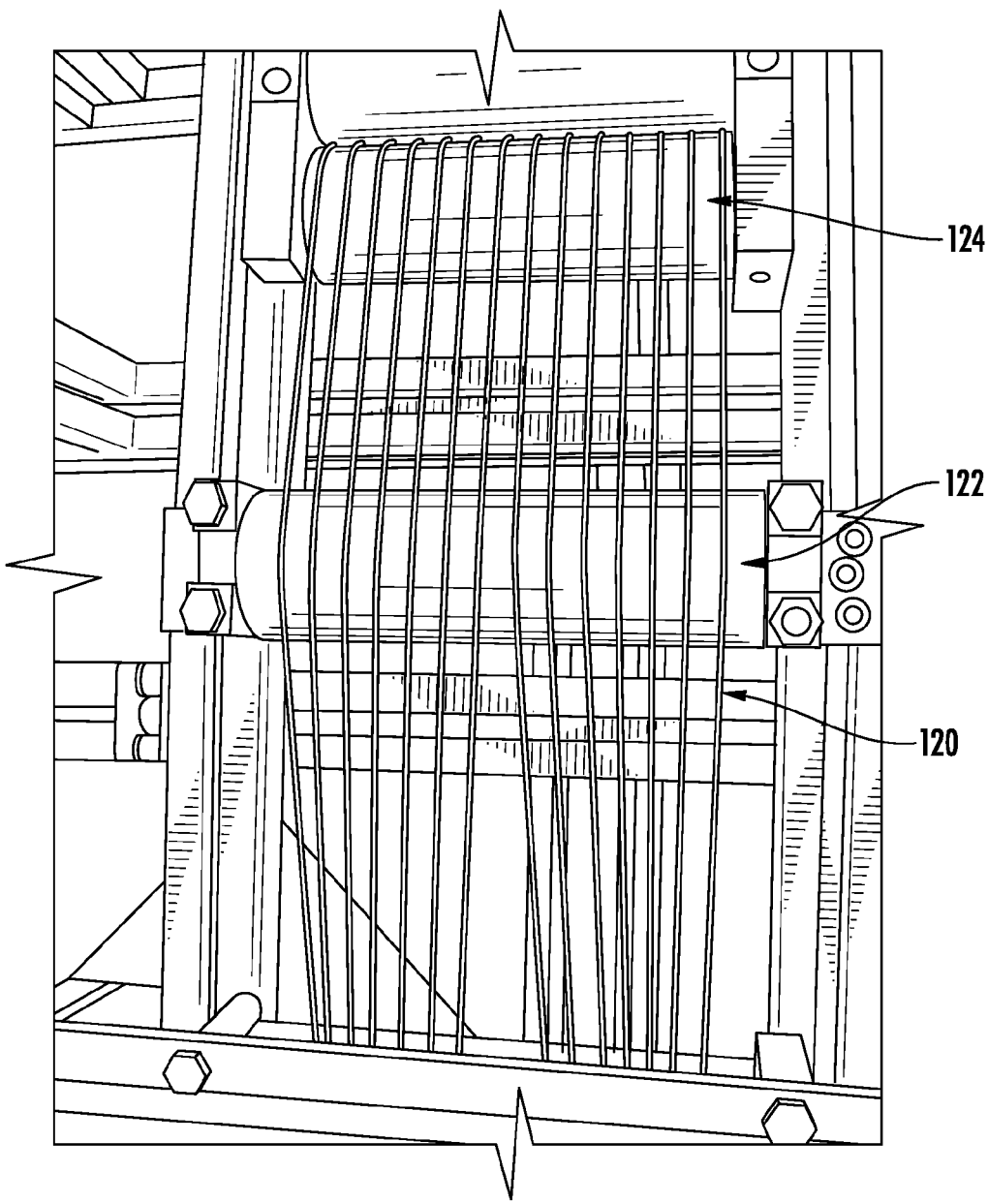
FIG. 16 shows a spacer station in which yarns are spaced apart prior to separation into filaments.
Figure 17:
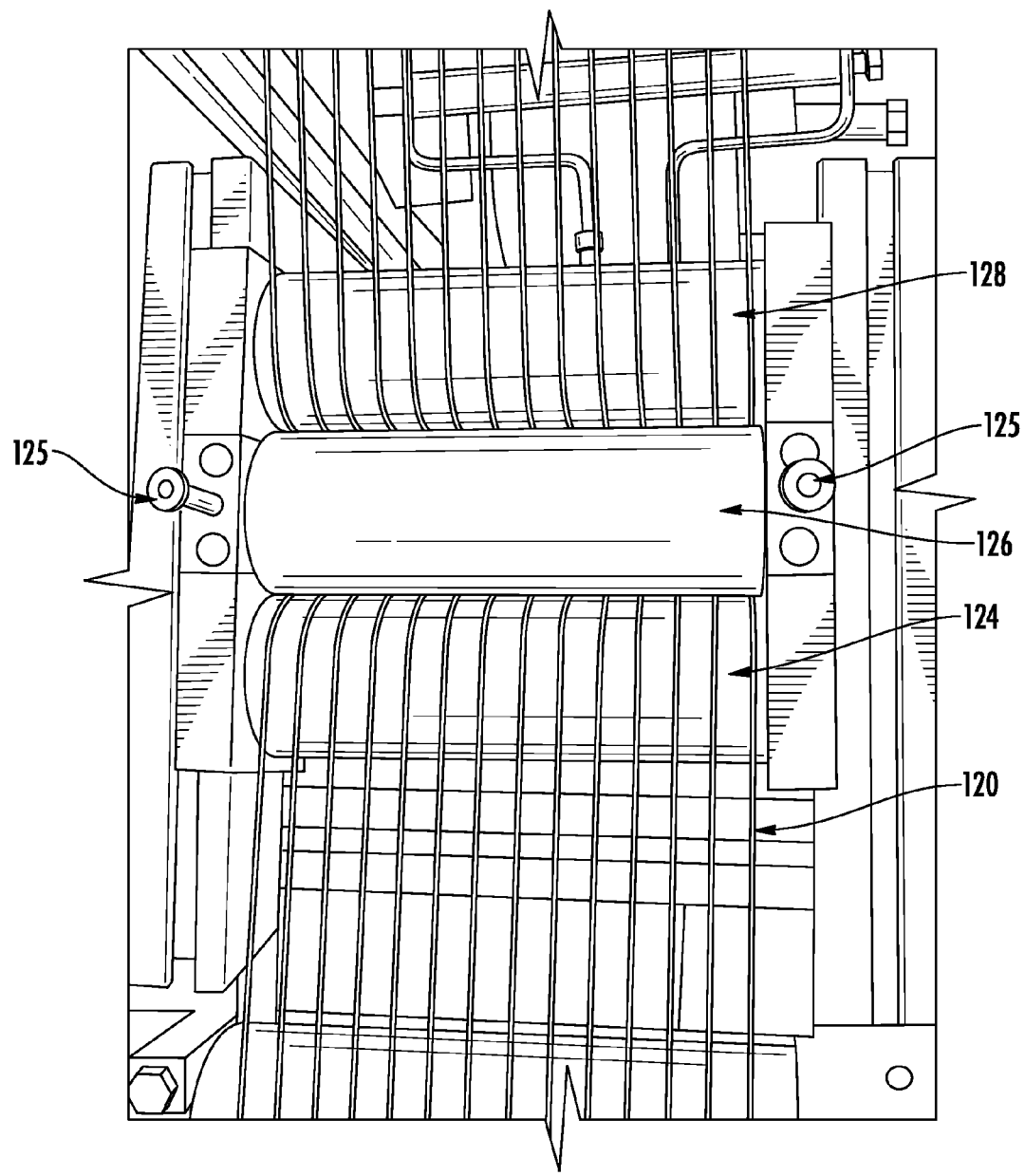
FIG. 17 shows a spreading station, including three rollers collectively termed a tension equalizer. The tension equalizer tensions the yarns and also helps to separate the yarns into filaments.

Similar to carbon yarns, aramid yarns are also readily, commercially available (e.g., Kevlar 49 1580 Dtex). Referring first to FIG. 15, to form the aramid yarns into filaments, in some embodiments, the aramid yarns 112 must first be unwound from the spool 110 and untwisted at an unspooling and unwinding station. Turning now to FIG. 16, the untwisted yarns 120 are then forwarded to a spacer station, and are positioned onto spacers 122, rollers with grooves etched into the surface of the roller, the grooves spaced at a desired width apart. The yarns 120 are positioned in the grooves of the spacers 122. For example, to form a tape of approximately 12-13 centimeters wide, comprising 14 yarns of 1000 filament tow of 1670 dtex aramid, a roller with 14 grooves, 11 millimeters (mm) apart is used. Turning to FIG. 17, the spaced yarns are then run through a tension equalizer. In some embodiments, a tension equalizer includes three rollers, 128, 124 and 126, each with an external diameter of about 500 mm. The center roller 126 is pushed down, relative to the outer two rollers 124 and 128, thereby equalizing the tension between the tows. Tension can be adjusted by adjusting the position of the center roller 126, either up or down, relative to the outer rollers 124 and 128, by turning adjusting screws, 125. The tension equalizer also helps to start spreading the yarns into filaments.

Figure 18:
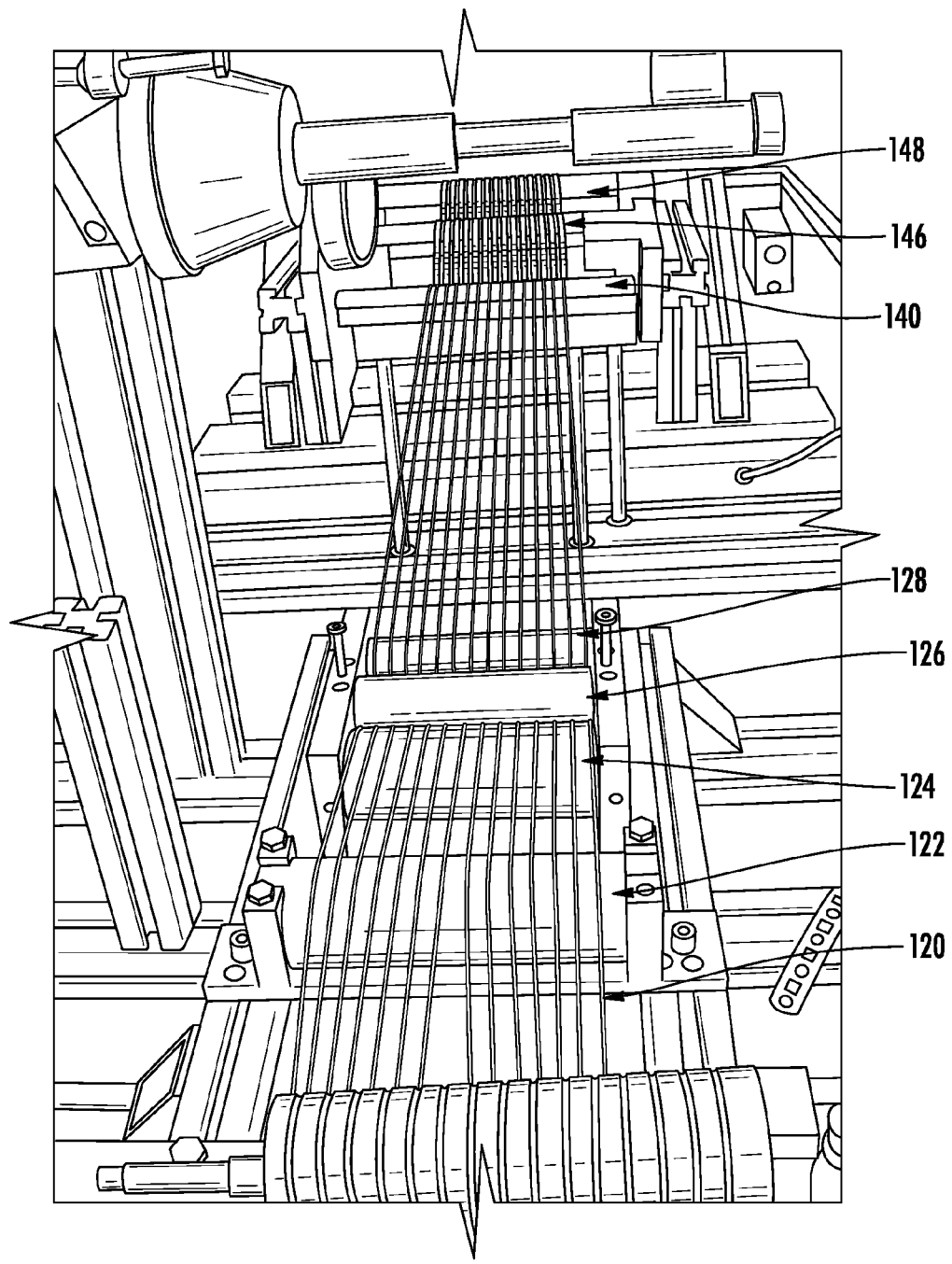
FIG. 18 shows an overview of the yarns feeding from a spacer station to a spreading station with tension equalizer, and then feeding into a second spreading station.
Figure 19:
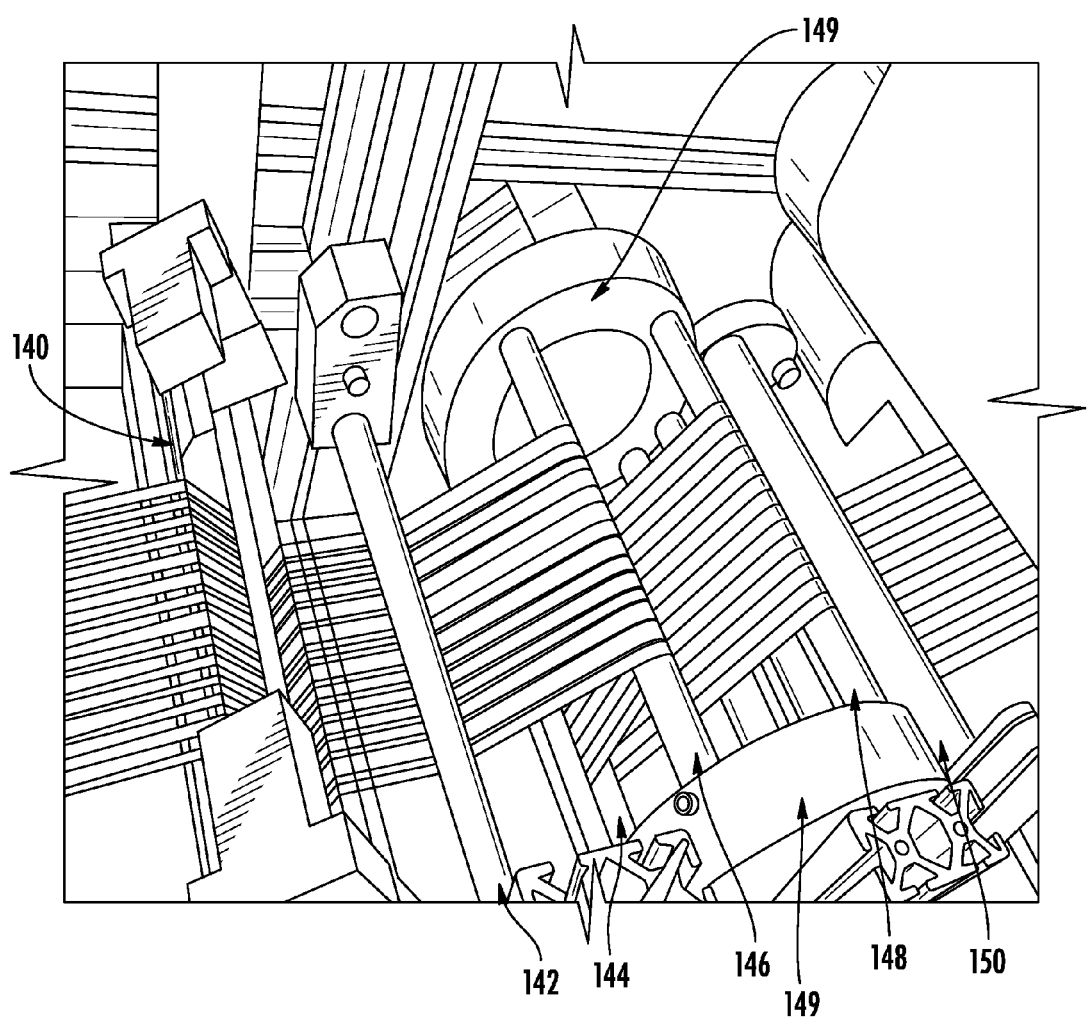
FIG. 19 shows a spreading station which includes knives and bars to spread the yarns into filaments.

Referring now to FIG. 18, the yarns 120 are then fed over a spreading station which includes a series of knives and bars, chromed and polished flat blades or rollers, 140, 146 and 148. FIG. 19 illustrates one embodiment of the knife/bar assembly. The first knife 140 has a radius edge of about 1.5 millimeters. The next four bars 142, 144, 146 and 148 are approximately 20 mm in diameter, and the last bar 150 is approximately 40 mm in diameter. Bars 144, 146 and 148 are fixed on 2 disks 149 that can be rotated. The yarns are led over the knife/bar assembly, resulting in the separation of the yarn into filaments. A film of glue (e.g., EMS 2AS) is introduced under the 40 mm bar 150 to coat the spreading tows and form the tape. The tape is then spooled into a roll for storage and use.

3. Additional Tape Examples

In addition to the carbon and aramid tape examples described above, any other natural or man-made yarns or filaments may be used to make tapes, and the tapes can generally be formed using any glue or resin, depending on the application. In addition, filaments of one type of yarn (e.g., carbon filaments) may be placed adjacent one or more filaments of another type of yarn (e.g., aramid filaments) to form a hybrid tape. Such tapes may advantageously combine the advantages of both types of fibers, while minimizing the drawbacks of each. Tapes may be formed of different fibers, glues and additives, depending on the application for the tape within the sail. Non-limiting examples of such tape compositions are provided below.

a) Tape Composition: Filaments and Glue Only

A tape made of aramid tow, spread into filaments, and held together using a thermoplastic glue, such as EMS 2AS. Such a tape is useful to provide strength in the primary load direction of the sail.

b) Tape Composition: Filaments and Scrim

A tape made of aramid tow, spread into filaments, and held together using a thermoplastic glue, such as EMS 2AS. In addition, a scrim material is used as a carrier for the filaments, to hold the filaments together. This tape allows the use of fewer aramid filaments for the same width of tape, or it permits the same number of aramid filaments, but with some spacing between aramid tows. The use of scrim can provide a lighter tape, depending on the amount of aramid filaments, and it provides strength transverse to the primary axis of the tape.

c) Tape Composition: Non-Woven and Filament

A tape made of aramid tow, spread into filaments, and held together using a thermoplastic glue, such as EMS 2AS. In addition, a non-woven material is used as a carrier for the filaments. The non-woven material is used as an anti-abrasion material on the external surface of the sail. In addition, various additives, such as carbon black, Tinuvin® (a UV protectant available from Ciba®), and Irganox® (a heat treating stabilizer available from Ciba®) may be added to the resin to protect the sail.

d) Tape Composition: Non-Woven

A non-woven material, with or without additives such as those described above, may be formed in a tape without the use of aramids or other filaments.

e) Tape Composition: Glue

It may be advantageous in some circumstances to add a tape formed from glue, with or without carbon black and/or other additives, but without the use of filaments.

4. Other Components

Other components may be used to provide additional properties to the tapes, and thus, to the fabrics formed from the tapes. For example, for fabrics which will be exposed to ultraviolet light (e.g., sails), a UV protective component may be added to the tapes by incorporating the additive to the resin.

B. Tape Lay-Up and Panel Formation

Figure 20:
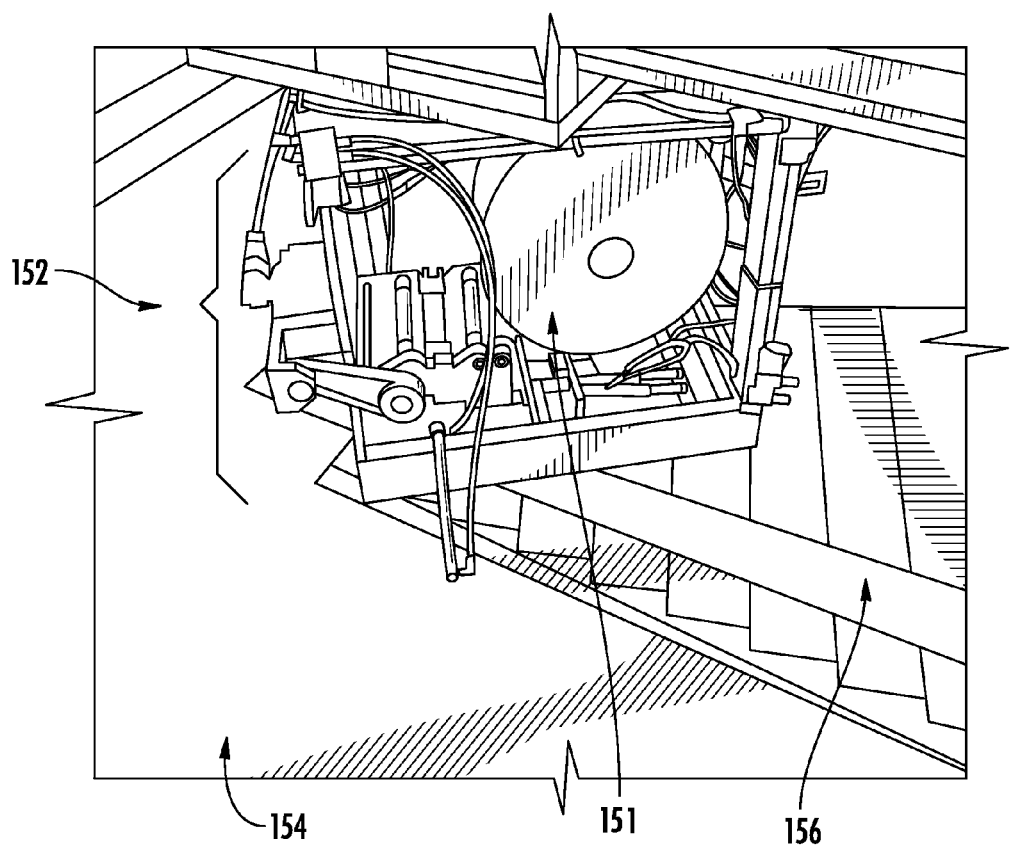
FIG. 20 shows a tape placement station, including a gantry head which positions tapes onto a plotting table to form a panel.
Figure 21:
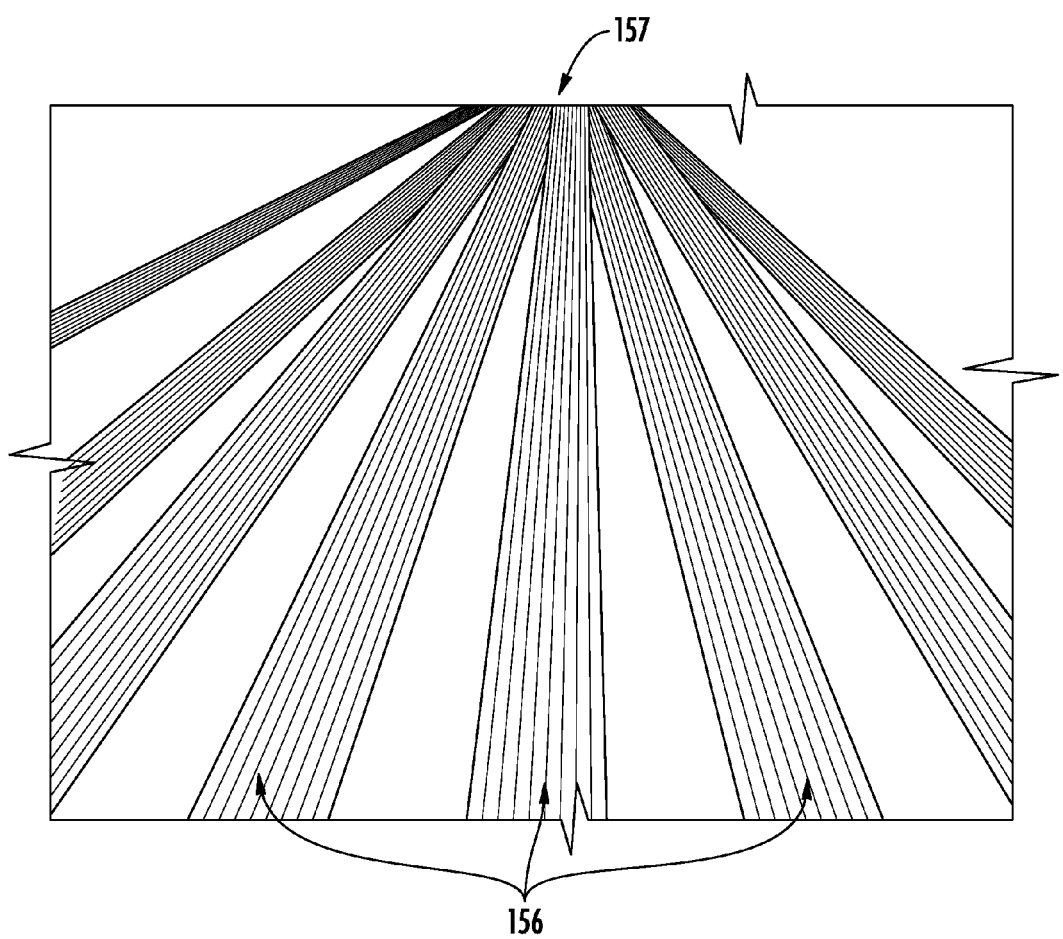
FIG. 21 shows the first laid tapes of a sail corner.
Figure 22:
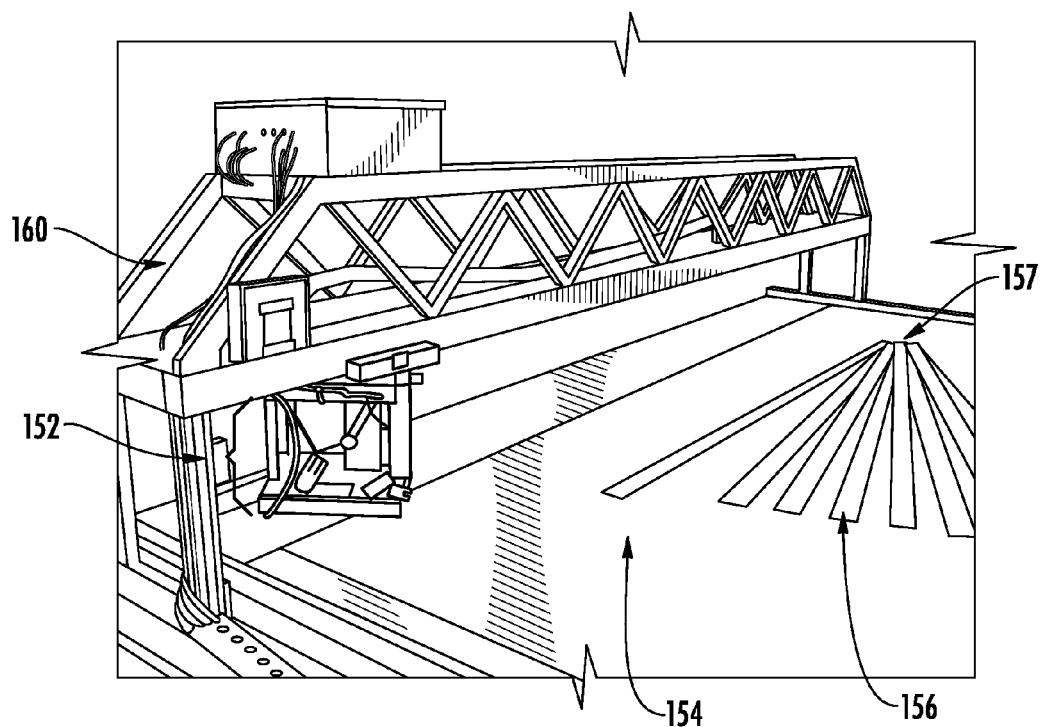
FIG. 22 shows an overview of a tape placement station, including a plotting table, gantry, and gantry head. The first laid tapes of a sail corner are also shown.
Figure 23:
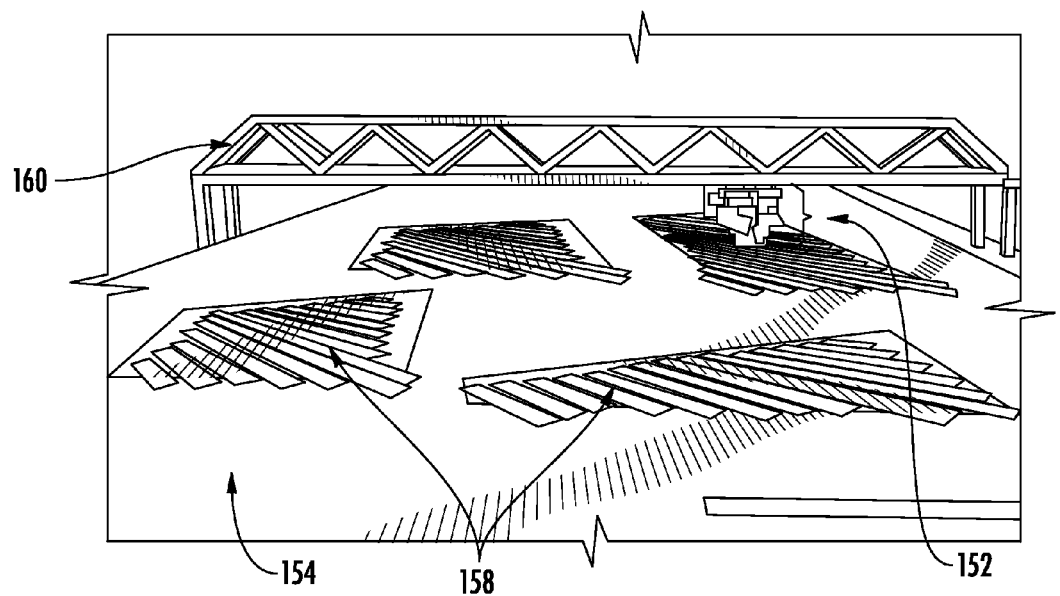
FIG. 23 shows multiple sections or panels laid up on a plotting table. The gantry and head are also shown.

For convenience, the formed tapes may be stored as rolls 151 (e.g., similar to a roll of masking tape or duct tape). FIG. 20 shows a tape placement station. The tape placement is used to create different sections or panels of a sail. Generally, the tape rolls 151 are positioned on the head of a gantry 152, which is positioned over a plotting table 154. Computer programs are used to direct the gantry/head assembly to roll particular tapes 156 onto the plotting table 154 in specific, 2-dimensional configurations according to the sail pattern. FIG. 21 shows the first laid tapes 156 of a sail corner, and the apex of the corner 157. The tapes 156 are positioned to radiate from the corner 157 of the sail, generally parallel to the predicted load lines of the sail. Accordingly, the filaments within the tapes also radiate from the corner of the sail and are generally parallel to the predicted load lines of the sail. FIG. 22 shows an overview of the first laid tapes 156 of a sail corner 157, plotting table 154, gantry 160 and gantry head 152. FIG. 23 shows a plurality of different panels 158 formed on a plotting table 154. The gantry 160 and gantry head 152 are also shown.

The panel pattern, and the sail pattern, take into account both the final three-dimensional shape of the sail as well as reinforcement needs. For example, the various tape compositions described above may be positioned depending on the specific structural needs of the sail. For example, the non-woven or non-woven and filament tapes may be used on the outside plies of the sail fabric. (Additionally, a spun bond or other type of non-woven material could be placed on the exterior of the surface after the sail is created.) Tapes for local reinforcement of the sail (e.g., reinforcing eyelets, corner pockets, battens, etc.) or for reinforcement of the head, tack, clew and reef points may be placed in adjacent plies. Scrim and filament tapes may be used on inner plies of the sail to provide protection from transverse or off-axis loads encountered when the sail is in use. And the filament and glue only tape composition may be used in a center ply of the sail fabric to provide support along the predicted load lines of the sail and areas predicted to undergo high loads when the sail is in use. In addition, a light film may be added sandwiched between one or more of the plies of tape. This would make the sail fabric air impermeable, without the weight and other drawbacks associated with placing film on the outside of the sail fabric. Generally, the panels are formed such that at least some of the tapes (and the filaments of the tapes) run substantially parallel with anticipated loads in the sail (e.g., at least some of the tapes are positioned such that the tape filaments run generally parallel to the predicted load lines, or along at least a portion of the predicted load lines). Tapes are also positioned to provide support to predicted high-load areas. For example, tapes are aligned along load lines, and are positioned to reinforce the corners of the sails, luff, leech, and other areas anticipated to undergo high loads when the sail is in use. Accordingly, some regions of a panel include numerous, overlapping tapes, tapes crossed in different directions, overlapping tapes aligned in parallel, and tapes comprising different resin and reinforcing elements. In addition, at least some of the tapes will be oriented at an angle to the anticipated load lines of the sail. Additionally, different tapes are used to add different, desired properties (e.g., reinforcement, lighter weight, flexibility, etc.) to different regions of the sail. As an example, the tapes shown in FIGS. 21 and 22 may be overlaid with arcs of tape, with the corner of the sail being roughly the center of the arc. Additional tapes may be added which also radiate from the corner of the sail, etc.

Because the tapes can be made to be slightly tacky, overlapping and adjacent tape layers stick together sufficiently for the formed panels to be maintained. Additionally or alternatively, heat may be applied to the laid-up panels on the plotting table to cause the glue of overlapping and adjacent tapes to become more tacky, allowing the tapes to better adhere to one another, thereby allowing the panels to remain formed. After the panels are formed, they are moved to a three-dimensional mold.

C. Assembling Panels

Figure 24:
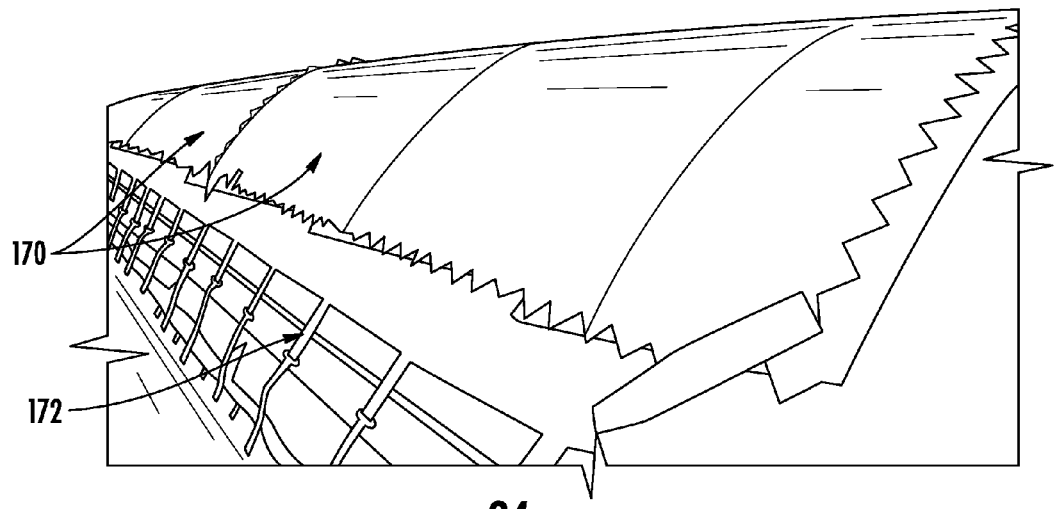
FIG. 24 shows formed panels positioned on a three-dimensional mold.
Figure 25:
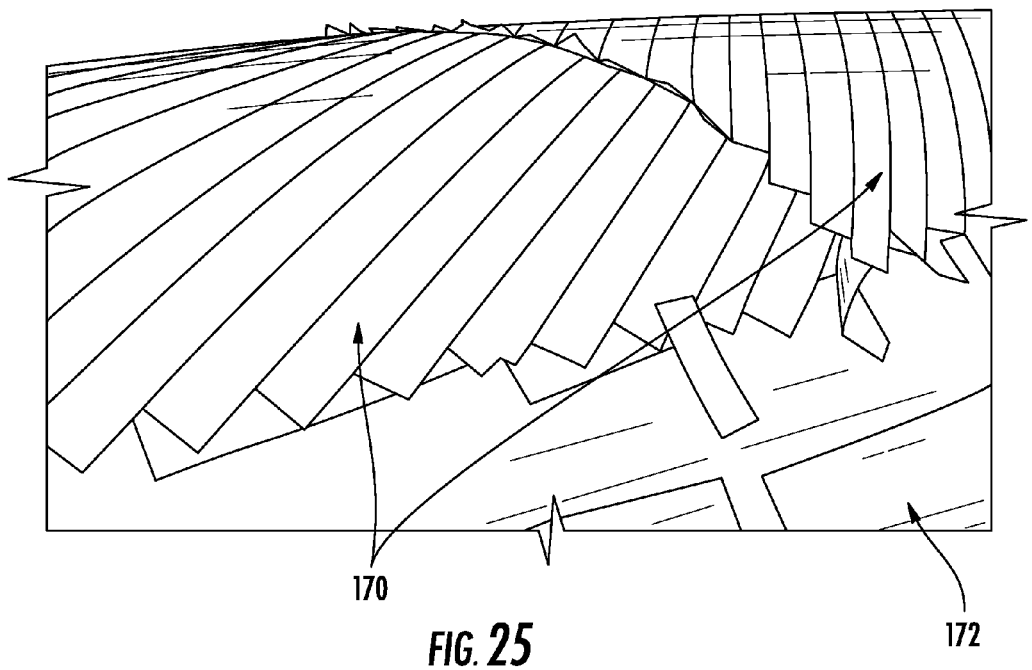
FIG. 25 shows another view of the panels positioned on a three-dimensional mold.

In general, panels are formed with one or more margins along the edge of the panel. Referring to FIGS. 24 and 25, to join the panels, the panels 170 are positioned on a mold formed in the shape of the final sail 172. The margins are used as the region of attachment between panels; that is, the margin of one panel is layered or overlapped onto the margin of an adjacent panel. The width of the overlap is determined by the number of tapes in the cross-sectional thickness of the material. In general, the thicker the cross-section (i.e., the more tapes in the cross-section), the greater the overlap. The overlapped margins, as well as the rest of the panels, are then subject to heat and pressure sufficient to meld the margins, and tapes together (the heat and pressure allow the glue and filaments of the tapes to intermix), thereby joining the panels, and the tapes within each panel, to form the sail.

Figure 26:
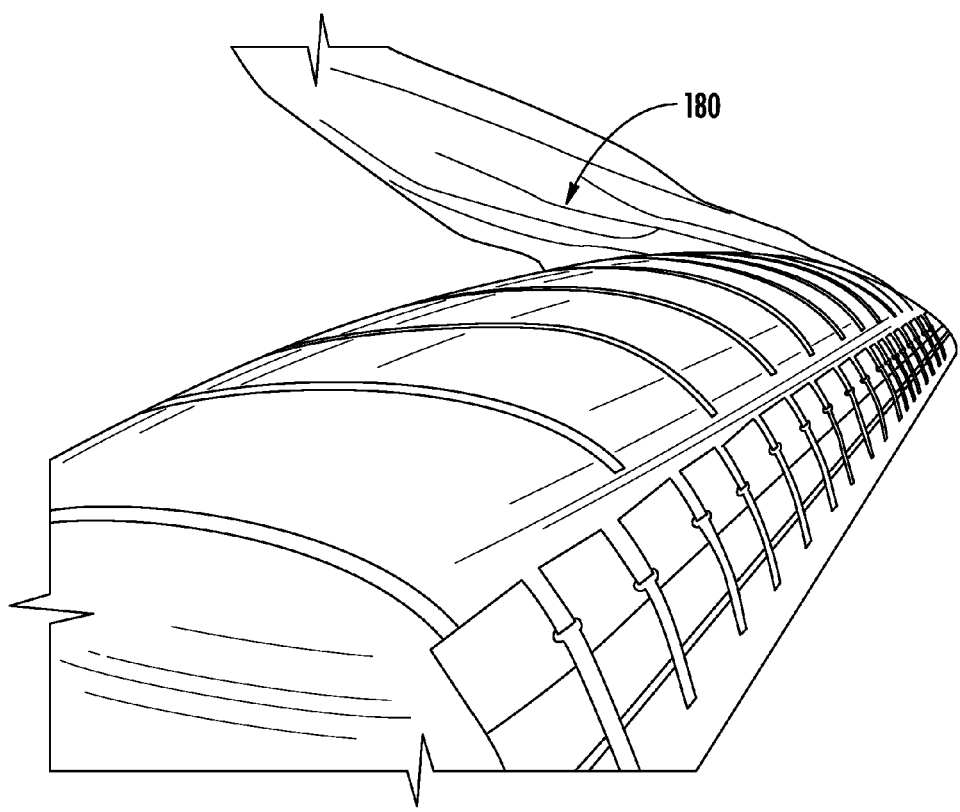
FIG. 26 shows the formation of a vacuum bag over the panels on the mold.
Figure 27:
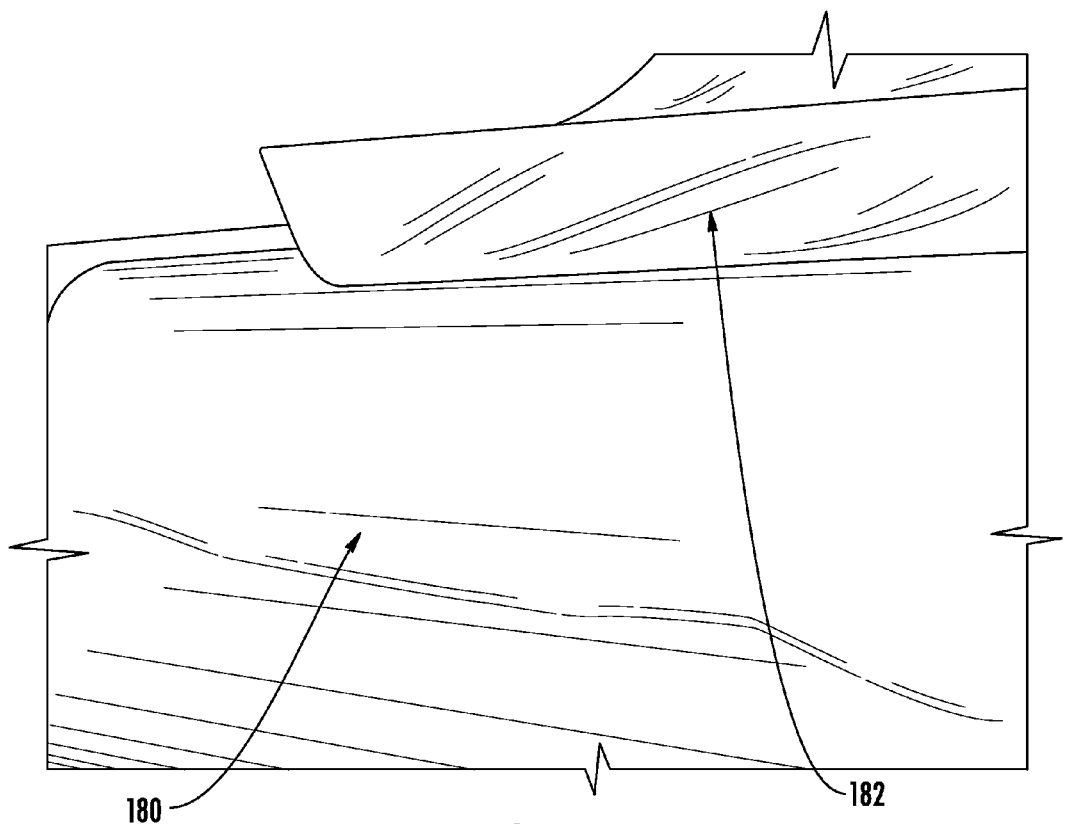
FIG. 27 shows a drag blanket being used to apply heat to the pressurized panels beneath the vacuum bag.

Referring to FIG. 26 and FIG. 27, once the panels are positioned on the mold with adjacent edges overlapping, the panels are then subject to a vacuum. In some embodiments, the panels are covered with a large vacuum bag or vacuum cover 180. A vacuum is applied and the strips/panels are typically compressed at approximately 1,800 pounds per square foot. In some embodiments, strips/panels are compressed at from about 1700 to about 1900 pounds per square foot. In other embodiments, strips/panels are compressed at from about 1500 to about 1800 pounds per square foot; while in still other embodiments, strips are compressed at from about 1800 to about 2000 pounds per square foot.

Similar to the method described in Section I above, the panels are adhered together via the application of pressure and heat. In some embodiments, heat and pressure are applied through the mold. For example, in some embodiments, the mold is equipped with heating elements. In other embodiments, the gantry head is removed and replaced with a carbon element heat "blanket," or hot air may also be used to provide heat. Referring to FIG. 27, a heat blanket 182 is show attached to the gantry head (not shown). The heat blanket 182 positioned cures the pressurized resin under the vacuum bag 180 by imparting a carefully controlled amount of heat. This causes the pressurized strips to conform tightly to the mold. The heat and pressure causes the glue and filaments from overlapping tapes to mingle and adhere, forming a contiguous piece of material. Note that heat and pressure may be applied simultaneously or serially.

Figure 28:
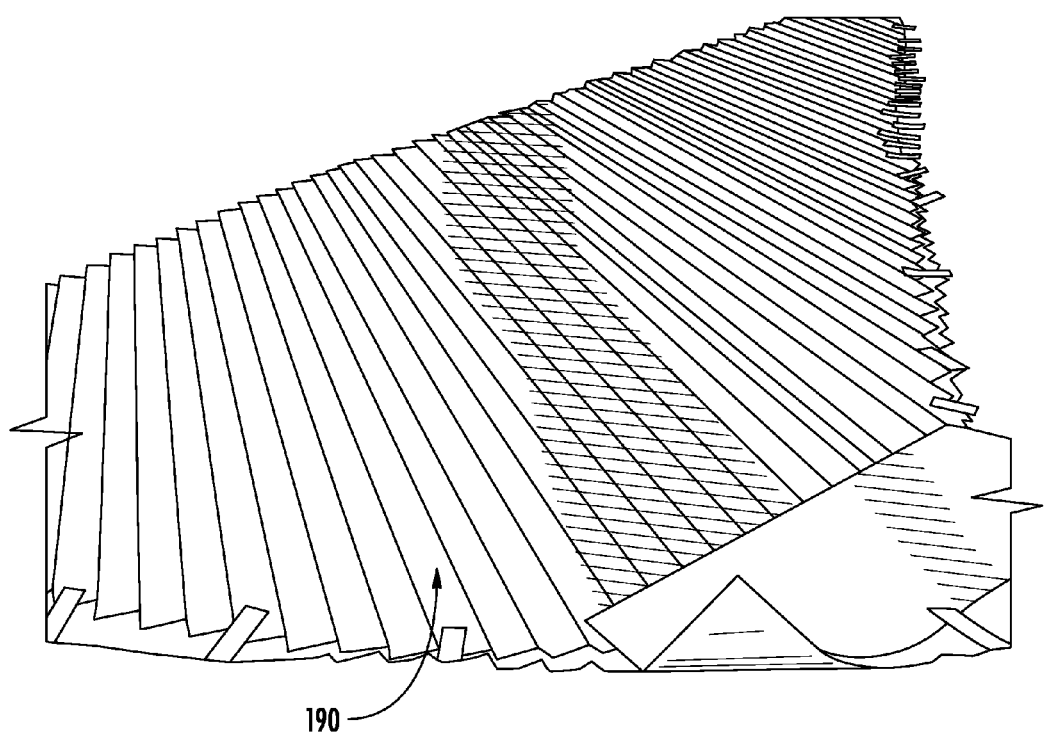
FIG. 28 shows the composite sail, ready for trimming and finishing.

The shaped material, 190 at FIG. 28, is then ready to be trimmed and finished (e.g., by adding bolt ropes, batten pockets and protective patches, etc.) to form a sail.

D. Alternative Tape Lay-Up and Panel or Sail Formation

While the above example describes forming the panels on a plotting table or other surface and then transferring the panels to a mold, in other embodiments, the gantry and head may be positioned over the mold, and tapes may be rolled directly onto the mold, as described below.

To form a panel, the strips are unrolled onto the mold according to the computer generated pattern. A 6-axis head suspended from a computer controlled overhead gantry is used to apply the strips onto the surface of the mold, following the three-dimensional curve of the mold surface. The head forms a pattern of the strips that matches anticipated loads in the sail (e.g., some of the tapes are positioned such that the filaments of the tapes run generally parallel to predicted load lines). As described above, the pattern accounts for reinforcement along the predicted load lines of the finished sail, at locations that need reinforcement (e.g., corners, leech, luff, etc.) as well as the final, three-dimensional shape of the finished sail. Accordingly, some regions of the panel included numerous, overlapping strips, strips crossed in different directions and overlapping strips aligned in parallel, and strips comprising different resin and reinforcing elements.

Similar to the method describe above in Section C, once the strips are laid, they are then covered with a large vacuum bag that compresses the strips at approximately 1,800 pounds per square foot. The pressurized strips are treated with a heat blanket to cure the pressurized resin, causing the strips to conform tightly to the mold.

Once the strips are joined together and cured, trimming and finishing may begin.

What is claimed is:

1. A method of manufacturing a sail having least a leech, a foot, and a luff, the method comprising the steps of:
    providing a plurality of first strips comprising filaments and resin;
    providing a plurality of second strips comprising filaments, a thermoplastic glue, and a scrim material used as a carrier for the filaments;
    providing a plurality of third strips comprising a non-woven material;
    providing a film;
    positioning the first strips onto a shaped three dimensional mold such that the filaments of the first strips are generally parallel to predicted load lines to which the sail will be subjected;
    positioning the second strips to provide reinforcement in a direction non-parallel to the predicted load lines;
    positioning the third strips as outer layers of the sale to provide anti-abrasion properties;
    positioning the film between the layers of the first, second, or third strips to make the sail air impermeable;
    applying pressure and heat to the strips on the mold, thereby joining the strips to form a shaped fabric, wherein the filaments did not form a fabric at least until combined with the resin; and
    forming a sail from the shaped fabric comprising a cured form of the resin encasing the filaments, and without outer layers of polymerized plastic sheets.

2. The method of claim 1, wherein the filaments comprise carbon.

3. The method of claim 1, wherein the filaments comprise aramid.

4. The method of claim 1, wherein applying pressure comprises applying a vacuum.

5. The method of claim 1, wherein the pressure is applied from about 1700 to about 1900 pounds per square foot.

6. The method of claim 1, wherein the pressure is applied to about 1800 pounds per square foot.

7. The method of claim 1, wherein applying pressure comprises forming a vacuum bag over the strips on the mold.

8. The method of claim 1, wherein the heat is applied with a heat blanket.

9. The method of claim 1, further comprising spreading out the filaments from yarn.

10. The method of claim 9, further comprising introducing the resin to the filaments that are spread out to form the strips.

11. The method of claim 1, wherein the strips comprise thousands of the filaments which are distributed over the width of each strip.

12. The method of claim 11, wherein the strips are layered such that the fabric comprises the thousands of the filaments are disposed unidirectionally in a first layer of the fabric.

13. The method of claim 12, wherein the strips are layered such that the fabric further comprises a second layer of thousands of the filaments which are disposed in another direction relative to the filaments of the first layer.

14. The method of claim 9, further comprising removing seizing from the yarn using electrified rollers.

15. The method of claim 1, wherein the sail further comprises at least one eyelet configured to operatively connect the sail to a wind-powered sailing vessel.

16. A method of manufacturing a sail, comprising:
    spreading out filaments of yarn by feeding the filaments over a first bar, a second bar, and a third bar, the first bar having a first radius, the second bar having a second radius which is greater than the first radius, and the third bar having a third radius which is greater than the second radius;
    forming a plurality of first strips consisting essentially of the filaments and a resin by coating the filaments with liquid resin and solidifying the resin
    forming a plurality of second strips different than the first strips and providing different material compositions;
    forming first panels by positioning the first strips onto a first planar surface and partially overlapping the first strips, and positioning a film between two of the strips, applying heat to the overlapping portions of the first strips;
    forming one or more second panels by positioning the plurality of second strips onto the first planar surface, and applying heat to the overlapping portions of adjacent second strips;
    moving the first and second panels from the first planar surface and positioning the first and second panels onto a shaped three-dimensional mold, wherein adjacent first and/or second panels overlap along their margins;
    positioning a vacuum bag over the first and second panels;
    applying vacuum pressure and heat to the first and second panels on the mold thereby joining the first and second panels to form a shaped fabric; and
    forming a sail from the shaped fabric comprising a cured form of the resin encasing the filaments.

17. The method of claim 16, wherein the film between the two of the strips is air impermeable.

18. The method of claim 16, wherein the sail further comprises at least one eyelet configured to operatively connect the sail to a wind-powered sailing vessel.

19. A method of manufacturing a sail having at least one corner, a leech, a luff, and a plurality of predicted load lines when the sail is in use, the method comprising the steps of:
    spreading out filaments of yarn;
    forming a plurality of first strips consisting essentially of filaments and a resin by coating the filaments with liquid resin and solidifying the resin;
    forming a plurality of second strips different than the first strips and providing different material compositions;
    forming one or more first panels by positioning the plurality of first strips onto a first surface and partially overlapping edges of adjacent first strips, and applying pressure and heat to the overlapping edges of adjacent first strips;

forming one or more second panels by position the plurality of second strips onto the first surface, and applying pressure and heat to the overlapping edges of adjacent second strips;

moving the first panels from the first surface onto a shaped three-dimensional mold having the shape of the sail, and positioning the first panels so that the filaments are generally parallel to the predicted load lines;

moving the second panels from the first surface and positioning the second panels onto the shaped three-dimensional mold;

applying pressure and heat to the first and second panels on the mold thereby allowing resin and filaments from adjacent and overlapping panels to intermix, and thereby joining the panels to form a shaped fabric forming the sail from the shaped fabric comprising a cured form of the resin encasing the filaments.

20. The method of claim 19, wherein the filaments comprise carbon.

21. The method of claim 19, wherein the filaments comprise aramid.

22. The method of claim 19, wherein applying pressure comprises applying a vacuum.

23. The method of claim 19, wherein the pressure is applied from about 1700 to about 1900 pounds per square foot.

24. The method of claim 19, wherein the pressure is applied to about 1800 pounds per square foot.

25. The method of claim 19, wherein applying pressure comprises subjecting the panels on the mold to a vacuum.

26. The method of claim 19, wherein the heat is applied with a heat blanket.

27. The method of claim 19, wherein positioning the strips comprises positioning a strip in a location on the sail that is predicted to require reinforcement.

28. The method of claim 27, wherein the location on the sail predicted to require reinforcement comprises a corner.

29. The method of claim 19, wherein positioning the second strips comprises positioning a second strip in a location on the sail that is predicted to require reinforcement.

30. The method of claim 19, further comprising forming the sail without outer layers of cover sheets.

31. The method of claim 19, wherein the sail further comprises at least one eyelet configured to operatively connect the sail to a wind-powered sailing vessel.

* * * * *

UNITED STATES PATENT AND TRADEMARK OFFICE
CERTIFICATE OF CORRECTION

PATENT NO. : 8,506,739 B2
APPLICATION NO. : 12/326683
DATED : August 13, 2013
INVENTOR(S) : Gérard Gautier et al.

It is certified that error appears in the above-identified patent and that said Letters Patent is hereby corrected as shown below:

IN THE CLAIMS

Claim 1:
Column 13, line 23, insert --at-- before "least"

Claim 1:
Column 13, line 25, insert --first-- after "comprising"

Claim 1:
Column 13, line 27, insert --second-- after "comprising"

Claim 1:
Column 13, line 29, insert --second-- after "the"

Claim 1:
Column 13, line 34, insert --first-- after "such that the"

Claim 1:
Column 13, line 39, replace "sale" with --sail--

Claim 1:
Column 13, line 43, insert --first, second, and third-- after "heat to the"

Claim 1:
Column 13, line 44, insert --first, second, and third-- after "joining the"

Claim 1:
Column 13, line 45, insert --first and second-- after "wherein the"

Signed and Sealed this
Twenty-ninth Day of October, 2013

Teresa Stanek Rea
*Deputy Director of the United States Patent and Trademark Office*

CERTIFICATE OF CORRECTION (continued)
U.S. Pat. No. 8,506,739 B2

Claim 1:
Column 13, line 48, insert --first and second-- after "encasing the"

Claim 2:
Column 13, line 50, insert --first-- after "wherein the"

Claim 3:
Column 13, line 52, insert --first-- after "wherein the"

Claim 7:
Column 13, line 61, insert --first, second, and third-- after "over the"

Claim 9:
Column 13, line 65, insert --first-- after "the"

Claim 9:
Column 13, line 65, insert --a first-- after "from"

Claim 9:
Column 13, line 65, insert --and spreading out the second filaments from a second yarn-- after "yarn"

Claim 10:
Column 13, line 67, insert --first and second-- after "resin to the"

Claim 10:
Column 13, line 67, insert --first and second-- after "form the"

Claim 11:
Column 14, line 1, insert --first-- after "wherein the"

Claim 11:
Column 14, line 2, insert --first-- after "thousands of the"

Claim 11:
Column 14, line 3, replace "each" with --the first--

Claim 11:
Column 14, line 3, insert --and the second strips comprise thousands of second filaments which are distributed over the width of the second strip-- after "strip"

Claim 12:
Column 14, line 4, insert --first-- after "wherein the"

Claim 12:
Column 14, line 5, insert --first-- after "thousands of the"

Claim 12:
Column 14, line 6, delete "are"

Claim 13:
Column 14, line 7, insert --second-- after "wherein the"

Claim 13:
Column 14, line 9, insert --second-- after "thousands of the"

Claim 13:
Column 14, line 10, insert --first-- after "relative to the"

Claim 16:
Column 14, line 21, delete "which is greater than the first radius"

Claim 16:
Column 14, line 22, replace "second" with --first--

Claim 16:
Column 14, line 25, replace "the filaments" with --first filaments--

Claim 16:
Column 14, line 25, insert --first-- after "coating the"

Claim 16:
Column 14, line 26, insert --;-- after "solidifying the resin"

Claim 16:
Column 14, line 27, insert --from second filaments-- after "second strips"

Claim 16:
Column 14, line 28, replace "providing" with --having--

Claim 16:
Column 14, line 31, insert --first-- after "two of the"

Claim 16:
Column 14, line 48, insert --first and second-- after "encasing the"

Claim 17:
Column 14, line 50, insert --first-- after "two of the"

Claim 19:
Column 14, line 58, insert --first-- after "essentially of"

Claim 19:
Column 14, line 59, insert --first-- after "coating the"

Claim 19:
Column 14, line 61, insert --from second filaments-- after "second strips"

Claim 19:
Column 14, line 62, replace "providing" with --having--

Claim 19:
Column 15, line 1, replace "position" with --positioning--

Claim 19:
Column 15, line 7, insert --first-- after "so that the"

Claim 19:
Column 15, line 13, insert --the-- after "allowing"

Claim 19:
Column 15, line 13, insert --the first and second-- after "resin and"

Claim 19:
Column 15, line 15, insert --first and second-- after "joining the"

Claim 19:
Column 15, line 15, insert --;-- after "fabric"

Claim 19:
Column 15, line 17, insert --first and second-- after "encasing the"

Claim 20:
Column 15, line 18, insert --first-- after "wherein the"

Claim 21:
Column 15, line 20, insert --first-- after "wherein the"

Claim 25:
Column 16, line 6, insert --first and second-- after "subjecting the"

Claim 27:
Column 16, line 9, insert --first-- after "positioning the"

Claim 27:
Column 16, line 10, insert --first-- after "positioning a"